US012640911B2

(12) United States Patent
Huang et al.

(10) Patent No.: US 12,640,911 B2
(45) Date of Patent: May 26, 2026

(54) METHODS AND ARRANGEMENTS FOR ENCRYPTION OF GROUP ADDRESSED MANAGEMENT FRAMES

(71) Applicant: Intel Corporation, Santa Clara, CA (US)

(72) Inventors: Po-Kai Huang, San Jose, CA (US); Daniel Bravo, Portland, OR (US); Ilan Peer, Modiin (IL); Ido Ouzieli, Tel Aviv (IL); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/129,384

(22) Filed: Mar. 31, 2023

(65) Prior Publication Data

US 2023/0239139 A1      Jul. 27, 2023

Related U.S. Application Data

(60) Provisional application No. 63/399,116, filed on Aug. 18, 2022.

(51) Int. Cl.
| | |
|---|---|
| *H04L 29/06* | (2006.01) |
| *G06F 21/00* | (2013.01) |
| *H04L 9/06* | (2006.01) |
| *H04L 9/08* | (2006.01) |

(52) U.S. Cl.
CPC .......... *H04L 9/0825* (2013.01); *H04L 9/0637* (2013.01)

(58) Field of Classification Search
None
See application file for complete search history.

(56) References Cited

U.S. PATENT DOCUMENTS

| | | | | |
|---|---|---|---|---|
| 2012/0163292 A1* | 6/2012 | Kneckt | ............. | H04W 52/0229 |
| | | | | 370/328 |
| 2014/0010223 A1* | 1/2014 | Wang | .................... | H04W 48/12 |
| | | | | 370/338 |
| 2019/0200278 A1* | 6/2019 | Ouzieli | ............... | H04W 12/106 |
| 2020/0245137 A1* | 7/2020 | Chitrakar | .......... | H04W 52/0219 |
| 2021/0168125 A1* | 6/2021 | Vemulpali | ............. | H04L 9/3236 |

(Continued)

FOREIGN PATENT DOCUMENTS

| | | | | |
|---|---|---|---|---|
| CN | 114448756 | A | * | 5/2022 |
| JP | 2022131667 | A | * | 9/2022 |

*Primary Examiner* — Lisa C Lewis
(74) *Attorney, Agent, or Firm* — KDW FIRM PLLC

(57) ABSTRACT

Logic for encryption and decryption of group addressed management. Logic to generate a management frame comprising a robust security network (RSN) element (RSNE), the management frame comprising a cipher suite field with a cipher suite used together with a set of one or more keys to encrypt the group addressed management frames. Logic to cause transmission of the management frame to one or more stations (STAs). Logic to receive a management frame comprising a robust security network (RSN) element (RSNE), the management frame comprising a cipher suite field with a cipher suite used together with a set of one or more keys to encrypt the group addressed management frames. And logic to decode the management frame to determine the cipher suite used together with the set of one or more keys for encryption of group addressed management frames.

25 Claims, 17 Drawing Sheets

(56)         References Cited

U.S. PATENT DOCUMENTS

| | | | |
|---|---|---|---|
| 2021/0185607 A1* | 6/2021 | Cariou | ............. H04W 52/0216 |
| 2021/0282007 A1* | 9/2021 | Ho | ...................... H04W 12/041 |
| 2021/0297184 A1* | 9/2021 | Huang | ................. H04L 1/1642 |
| 2022/0248465 A1* | 8/2022 | Yoshikawa | ........... H04W 84/12 |
| 2024/0215085 A1* | 6/2024 | Guo | ...................... H04W 76/14 |
| 2024/0215086 A1* | 6/2024 | Guo | ...................... H04L 67/303 |

* cited by examiner

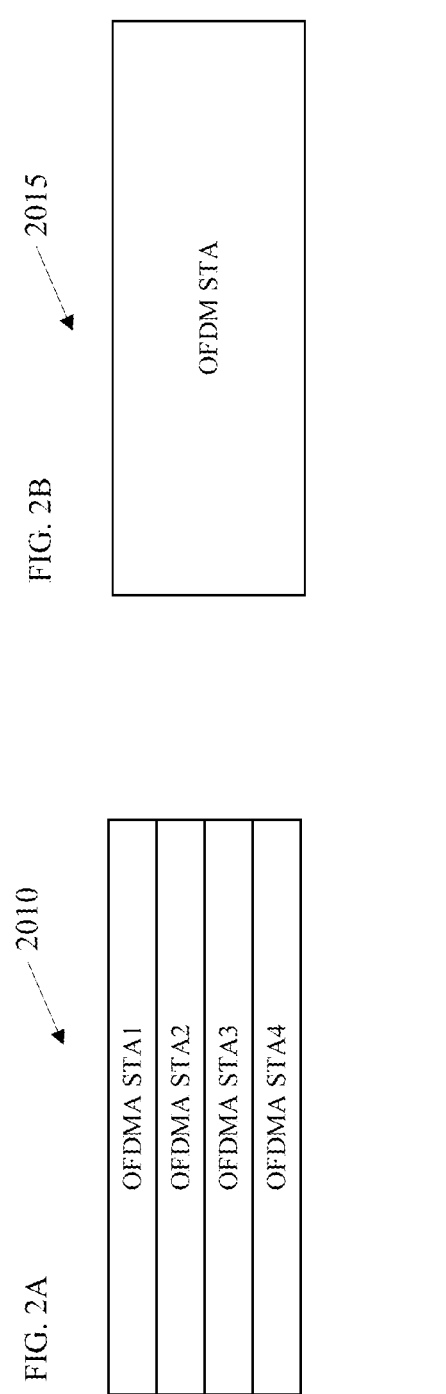
FIG. 2A
FIG. 2B
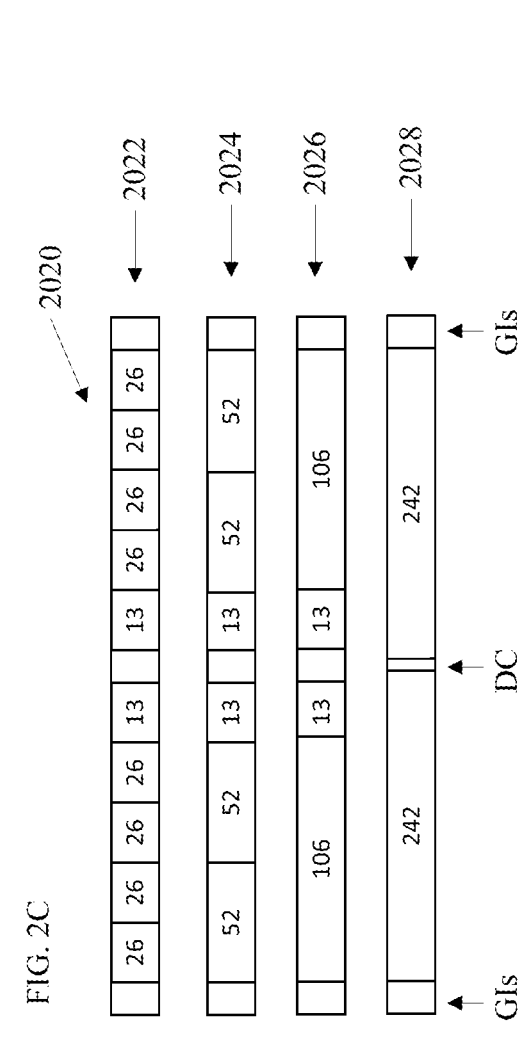
FIG. 2C

FIG. 2G – EAPOL-KEY FRAME FORMAT

| PROTOCOL VERSION | PACKET TYPE | PACKET BODY LENGTH | PACKET BODY |
|---|---|---|---|

2232

FIG. 2H – MLO MFGTK KDE FORMAT (DESCRIPTOR BODY)

| KEY ID | TX | RESERVED | LINKID | PN | MFGTK |
|---|---|---|---|---|---|

2234

FIG. 2I – MFGTK KDE FORMAT (DESCRIPTOR BODY)

| KEY ID | TX | RESERVED | RESERVED | PN | MFGTK |
|---|---|---|---|---|---|

2236

FIG. 2J — FT RESPONSE FRAME FORMAT

| CATEGORY | FT ACTION | STA ADDRESS | TARGET AP ADDRESS | STAUS CODE | FT RESPONSE FRAME BODY |
|---|---|---|---|---|---|

2238

FIG. 2K – MLO MFGTK SUBELEMENT FORMAT

| SUBELEMENT ID | LENGTH | KEY INFO | LINK INFO | KEY LENGTH | RSC | WRAPPED KEY |
|---|---|---|---|---|---|---|

2240

FIG. 2L – LINK INFO FIELD

| LINK ID | RESERVED |
|---|---|

2242

FIG. 2M – MFGTK SUBELEMENT

| SUBELEMENT ID | LENGTH | KEY INFO | KEY LENGTH | RSC | WRAPPED KEY |
|---|---|---|---|---|---|

2244

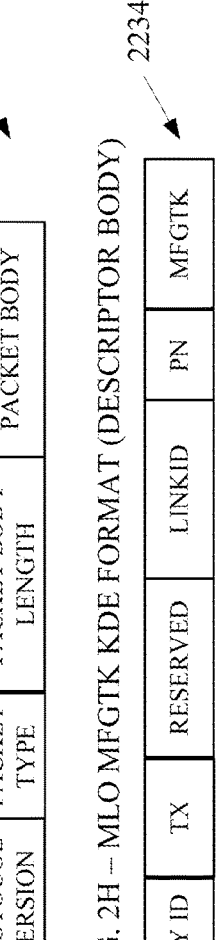

Figures 2N, 2O, 2P:
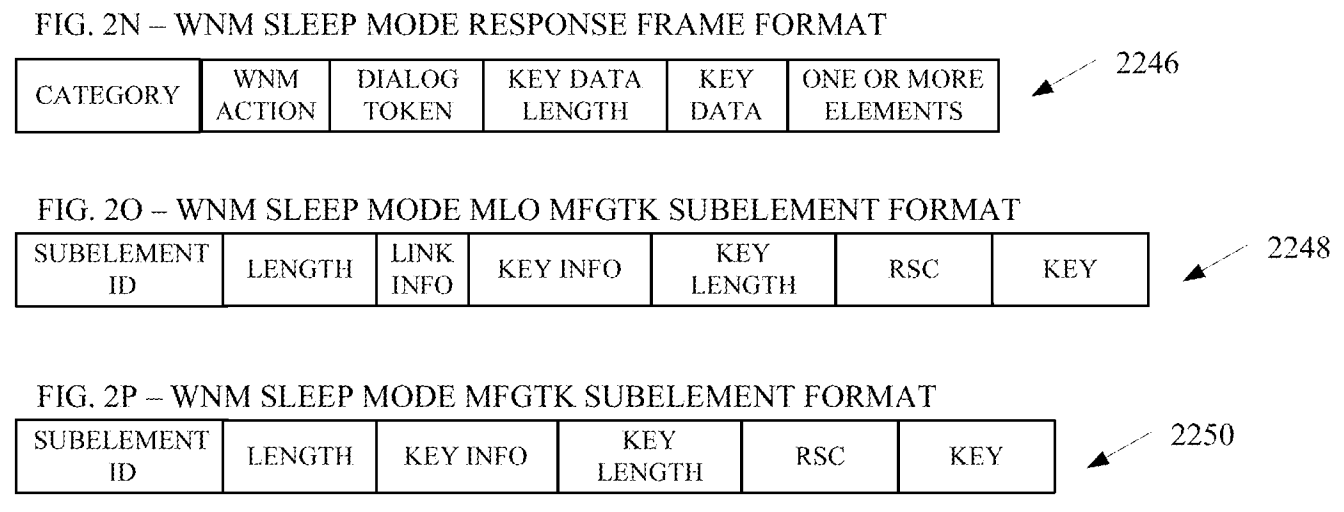

FIG. 2N – WNM SLEEP MODE RESPONSE FRAME FORMAT

2246

| CATEGORY | WNM ACTION | DIALOG TOKEN | KEY DATA LENGTH | KEY DATA | ONE OR MORE ELEMENTS |
|---|---|---|---|---|---|

FIG. 2O – WNM SLEEP MODE MLO MFGTK SUBELEMENT FORMAT

2248

| SUBELEMENT ID | LENGTH | LINK INFO | KEY INFO | KEY LENGTH | RSC | KEY |
|---|---|---|---|---|---|---|

FIG. 2P – WNM SLEEP MODE MFGTK SUBELEMENT FORMAT

2250

| SUBELEMENT ID | LENGTH | KEY INFO | KEY LENGTH | RSC | KEY |
|---|---|---|---|---|---|

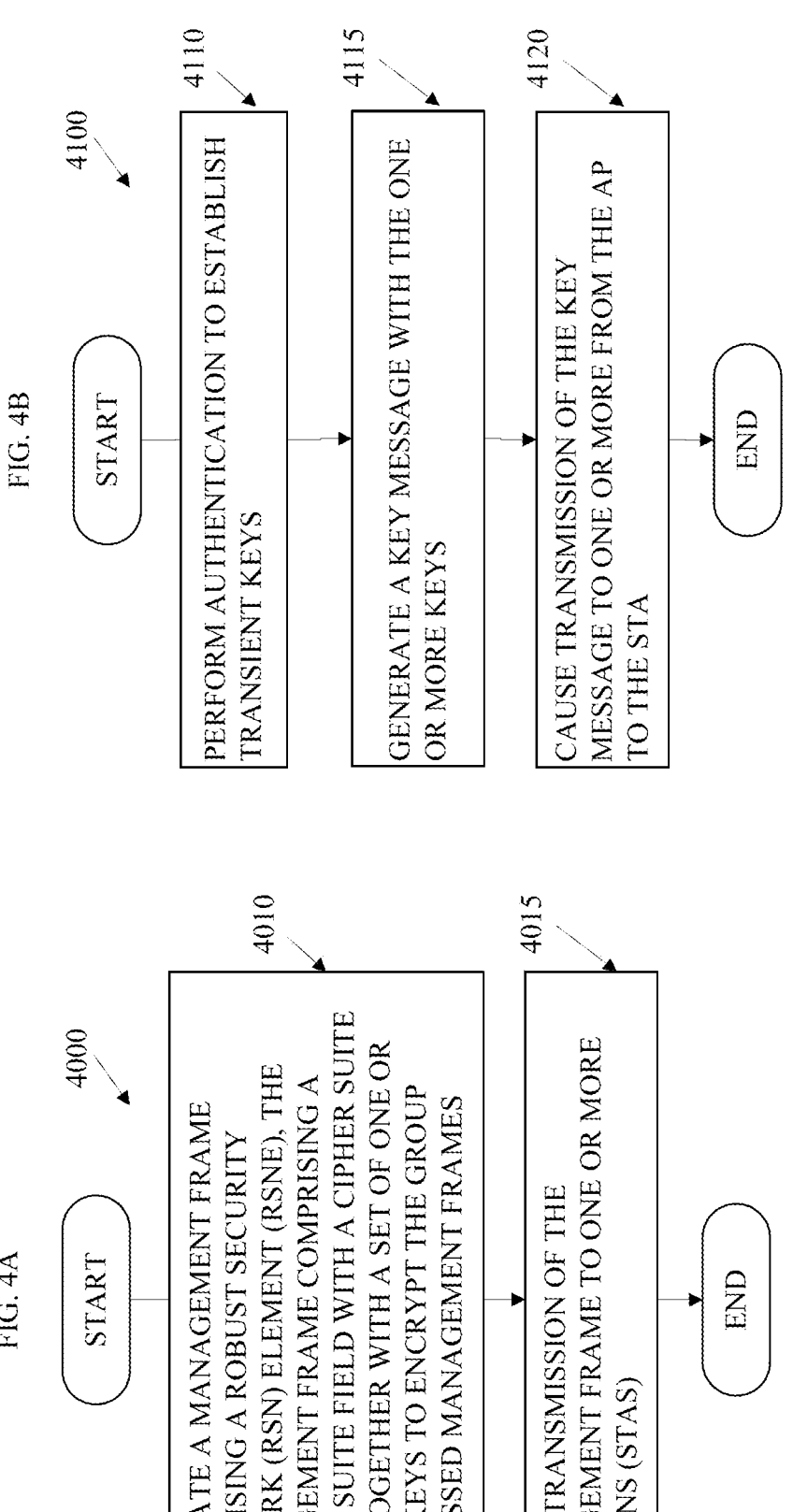

START

PERFORM AUTHENTICATION TO ESTABLISH TRANSIENT KEYS — 4110

GENERATE A KEY MESSAGE WITH THE ONE OR MORE KEYS — 4115

CAUSE TRANSMISSION OF THE KEY MESSAGE TO ONE OR MORE FROM THE AP TO THE STA — 4120

END

START

GENERATE A MANAGEMENT FRAME COMPRISING A ROBUST SECURITY NETWORK (RSN) ELEMENT (RSNE), THE MANAGEMENT FRAME COMPRISING A CIPHER SUITE FIELD WITH A CIPHER SUITE USED TOGETHER WITH A SET OF ONE OR MORE KEYS TO ENCRYPT THE GROUP ADDRESSED MANAGEMENT FRAMES — 4010

CAUSE TRANSMISSION OF THE MANAGEMENT FRAME TO ONE OR MORE STATIONS (STAS) — 4015

END

FIG. 4D

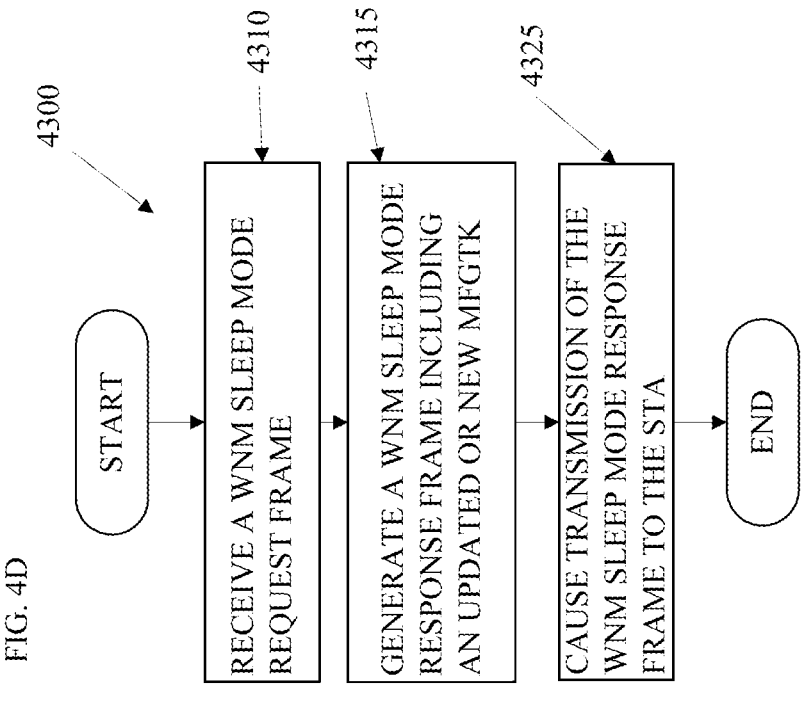

4300

START

RECEIVE A WNM SLEEP MODE REQUEST FRAME — 4310

GENERATE A WNM SLEEP MODE RESPONSE FRAME INCLUDING AN UPDATED OR NEW MFGTK — 4315

CAUSE TRANSMISSION OF THE WNM SLEEP MODE RESPONSE FRAME TO THE STA — 4325

END

FIG. 4C

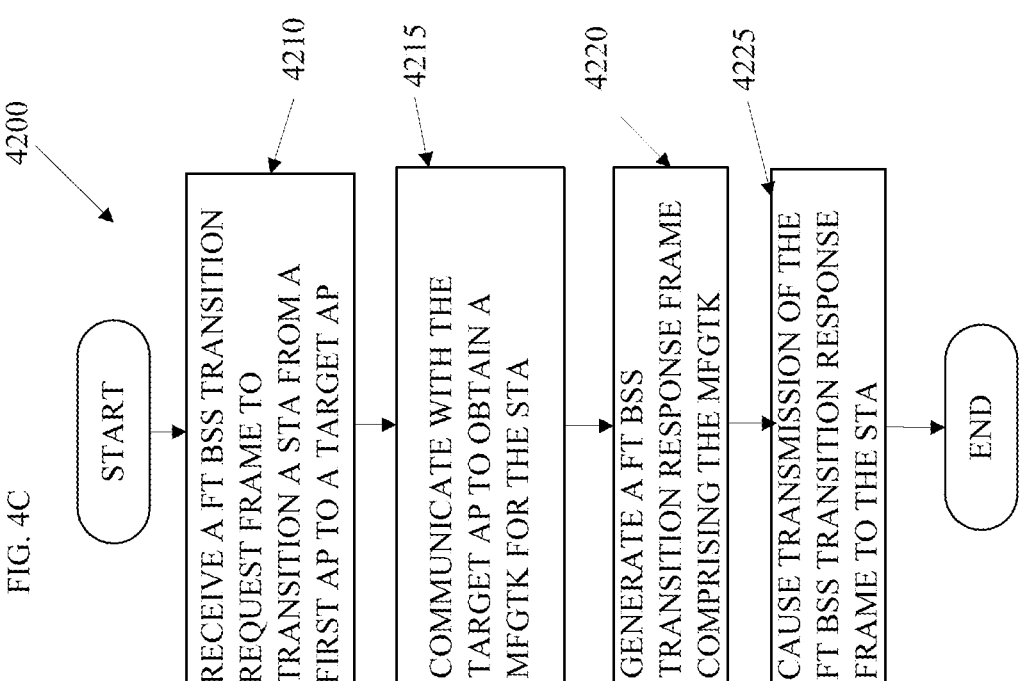

4200

START

RECEIVE A FT BSS TRANSITION REQUEST FRAME TO TRANSITION A STA FROM A FIRST AP TO A TARGET AP — 4210

COMMUNICATE WITH THE TARGET AP TO OBTAIN A MFGTK FOR THE STA — 4215

GENERATE A FT BSS TRANSITION RESPONSE FRAME COMPRISING THE MFGTK — 4220

CAUSE TRANSMISSION OF THE FT BSS TRANSITION RESPONSE FRAME TO THE STA — 4225

END

STORAGE MEDIUM 7000

COMPUTER
EXECUTABLE
INSTRUCTIONS FOR 7000

COMPUTING PLATFORM 8000

PROCESSING COMPONENT
8010

APPARATUS 8015

STORAGE
MEDIUM 8020

OTHER PLATFORM
COMPONENTS 8025

COMMUNICATIONS
INTERFACE 8030

METHODS AND ARRANGEMENTS FOR ENCRYPTION OF GROUP ADDRESSED MANAGEMENT FRAMES

CROSS REFERENCE TO RELATED APPLICATIONS

This application also claims priority under 35 USC § 119 from U.S. Provisional Application No. 63/399,116, entitled "GROUP ADDRESSED MANAGEMENT FRAME ENCRYPTION", filed on Aug. 18, 2022, the subject matter of which is incorporated herein by reference.

TECHNICAL FIELD

This disclosure generally relates to methods and arrangements for wireless communications and, more particularly, for encrypting group addressed frames for, e.g., mobile privacy.

BACKGROUND

Mobile device users commonly use mobile phones as access points for other devices owned by a user or for sharing Internet access or other network access amongst multiple mobile device users. For instance, a user may have a laptop, a tablet, and/or a watch that can communicate via the Internet but does not have access to the Internet if Wi-Fi is unavailable. In such circumstances, the user may execute code (such as a Soft AP) on a mobile device such as a mobile phone that operates as a mobile access point (AP) and that does have access to the Internet through, e.g., a cellular network or a satellite network. Thereafter, one or more mobile devices owned by the user or other users may connect to via the mobile AP.

The association process with such a mobile AP may involve the exchange of one or more management frames such as beacon frames, probe request frames, and/or probe response frames. In many situations, the mobile AP exchanges persistent identifiers referred to as personally identifiable information (PII) in unprotected broadcast frames such as a service set identifier (SSID), a basic service set identifier (BSSID), and/or another medium access control (MAC) address in MAC headers and/or a basic service set (BSS) color in a physical layer (PHY) preamble.

The persistent identifiers and/or other elements in such unprotected frames may offer sufficient information to create a unique fingerprint or signature for a mobile device so the mobile device can be identified and tracked.

BRIEF DESCRIPTION OF THE DRAWINGS

FIG. 2A depicts an embodiment of transmissions between four stations and an AP.

FIG. 2B depicts an embodiment of a transmission between one station and an AP.

FIG. 2C depicts an embodiment of a resource units in a 20 Megahertz (MHz) bandwidth.

FIG. 2G depicts an embodiment of a EAPOL-Key frame format.

FIG. 2H depicts an embodiment of data field for a multi-link operation (MLO) management frame group temporal key (MFGTK) key descriptor element (KDE) format.

FIG. 2I depicts an embodiment of a MFGTK KDE format.

FIG. 2J depicts an embodiment of a fast basic service set (BSS) transition (FT) response frame format.

FIG. 2K depicts an embodiment of a MLO MFGTK subelement format.

FIG. 2L depicts another embodiment of a Link info field of a subelement.

FIG. 2M depicts another embodiment of a MFGTK subelement format.

FIG. 2N depicts another embodiment of a wireless network management (WNM) sleep mode response frame format.

FIG. 2O depicts another embodiment of a WNM sleep mode MLO MFGTK subelement format.

FIG. 2P depicts another embodiment of a sleep mode MLO MFGTK subelement format.

FIG. 4A depicts an embodiment of a flowchart to implement encryption logic circuitry to identify a cipher suite for use together with one or more keys to encrypt a group addressed management frame.

FIG. 4B depicts an embodiment of a flowchart to transmit one or more keys.

FIG. 4C depicts another embodiment to transmit one or more keys.

FIG. 4D depicts another embodiment to transmit one or more keys.

DETAILED DESCRIPTION OF EMBODIMENTS

Figure 1A:
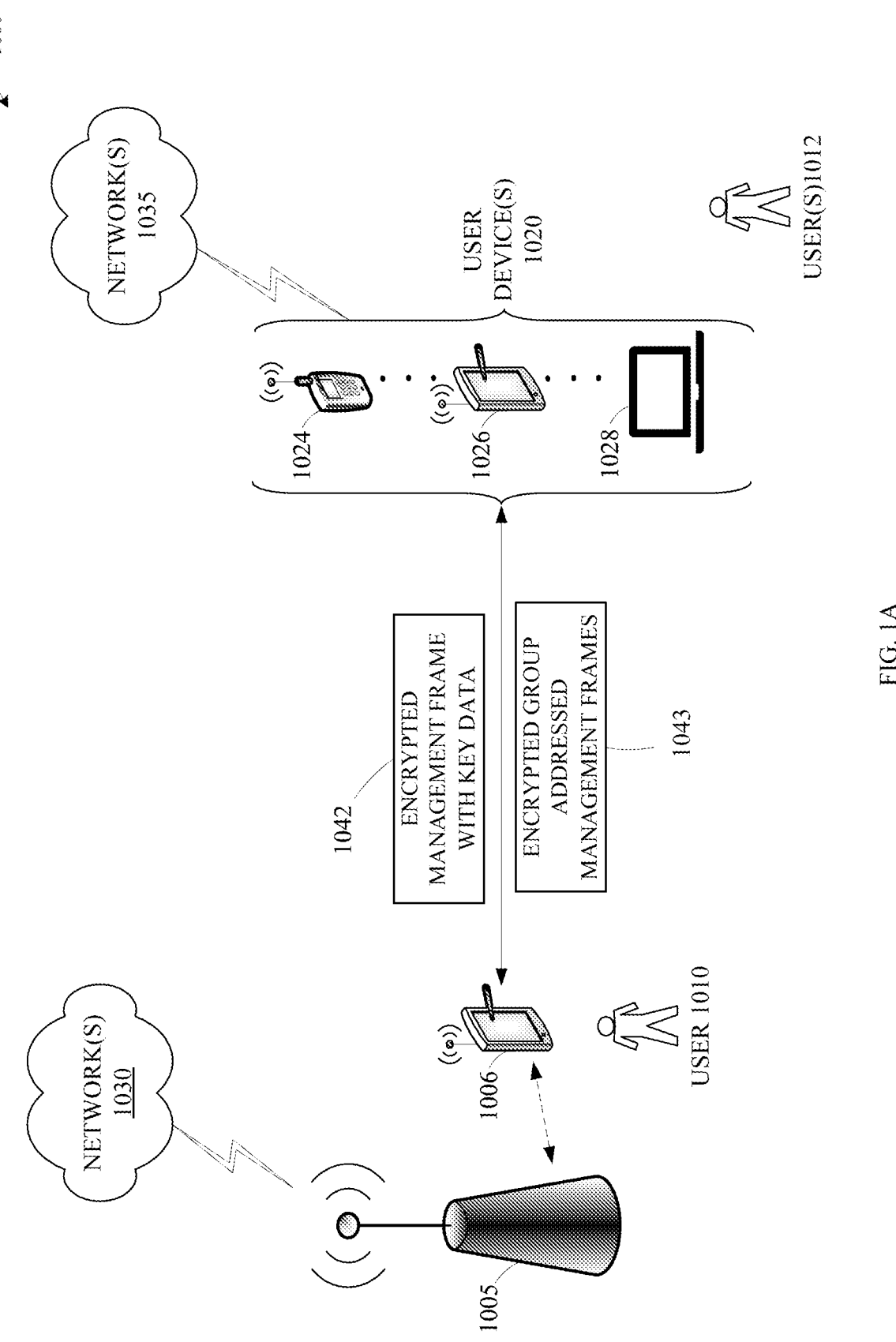
FIG. 1A is a system diagram illustrating an embodiment of a network environment for data encryption logic circuitry, in accordance with one or more example embodiments.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Embodiments may facilitate communications by stations (STAs) in accordance with different versions of Institute of Electrical and Electronics Engineers (IEEE) 802.11 standards for wireless communications such as IEEE P802.11bi, P802.11be™/D3.0, January 2023; IEEE 802.11-2020, December 2020; IEEE P802.11REVmd/D2.1, February 2019; IEEE P802.11ax™-2021, May 2021; IEEE P802.11ay™-2021, July 2021; IEEE P802.11az™/D3.0, IEEE P802.11ba™-2021, October 2021; IEEE P802.11bb™/D0.4, IEEE P802.11bc™/D1.02, and IEEE P802.11bd™/D1.1.

Embodiments may address the privacy leakage of unprotected group addressed management frames. There are currently many group addressed management frames, such as multicast-group addressed frames and broadcast frames, that are sent in clear that do not create privacy issue for the connecting client, but can create privacy issues for the mobile AP itself.

Examples of group addressed management frames that are sent in clear include a Beacon frame, Probe Response frame, fast initial link setup (FILS) discovery frame, Open Programmability System (OPS) frame, etc. Beacon frames and Probe Response frames, for example, have a number of elements that may include personal identifier information (PII) or personal correlation information (PCI) that may be used for element fingerprinting. However, encrypting such frames is difficult because each of these frames may have a timing synchronization function (TSF) value that is inserted into the frame right before the frame is transmitted. For instance, the TSF value for the FILS discovery frame may be the value of the TSF timer of a mobile AP device in a timestamp field at the time that the start of the data symbol containing the first bit of the timestamp field appears at the transmit antenna connector. The TSF value for a Probe response frame may be the value of the TSF timer of a mobile AP device in a timestamp field at the time that the start of the data symbol containing the first bit of the timestamp field appears at the transmit antenna connector. And the TSF value for a beacon frame may be the value of the TSF timer of a mobile AP device in a timestamp field at the time that the start of the data symbol containing the first bit of the timestamp field appears at the transmit antenna connector.

The FILS discovery and OPS frame do not have rich number of elements, but elements like a traffic indication map (TIM) element, an OPS element, a target wake time (TWT) element, and a transmit power envelope element has information that may be used for element fingerprinting.

Some management type, action subtype frames may include PII such as wireless networking management fast initial link setup (FILS) frames. Embodiments may protect such action frames with the same cipher suites and keys defined for group addressed management frames.

The IEEE 802.11-2020 standard includes a broadcast/multicast integrity protocol (BIP) that introduces a message integrity code (MIC) for authentication via data integrity and replay protection but does not encrypt group addressed management frames such as beacon frames, probe response frames, OPS frames, FILS discovery frames, and the like.

Embodiments may, advantageously, use the mechanisms in the 802.11 standards such as robust security network (RSN) association (RSNA) for communication of, or other provision of, one or more keys related to the BIP, such as a beacon integrity group temporal key (BIGTK) and a group temporal key (GTK), but creates a new key for encryption of the group addressed management frames and/or repurposes one or more of the keys from authentication with a message integrity code (MIC) to encryption of the group addressed management frames. Reuse of one or more keys related to BIP may involve use of a field for a cipher suite for the BIP to define a cipher suite for encryption of group addressed management frames that may be used in conjunction with the one or more keys for encryption of group addressed management frames. The alternative definition of the cipher suites from the BIP cipher suites to encryption cipher suites may signal the use of the cipher suite and keys for encryption/decryption of group addressed management frames rather than for BIP protection.

Reuse of the RSN mechanisms may advantageously encourage wide-spread use of the encryption to protect private personal information. For example, some embodiments may encrypt the frame body of beacon frames, probe response frames, FILS discovery frames, OPS frames, and the like, that do not include TSF values in a timestamp field in the frame body. Some embodiments may encrypt the frame body of frames that include a TSF value in the frame header or otherwise pre-pended or appended to the frame body.

Embodiments may advantageously define one or more keys for use together with cipher suites to encrypt group addressed management frames, define delivery methods to deliver the one or more keys, and define group addressed management frames that can be encrypted with the one or more keys. Some embodiments may advantageously address privacy issues for potential group addressed management frames with or without TSF values in a timestamp field carried in the group addressed management frame. Some embodiments advantageously may define standard methods to deliver and update the one or more keys without requiring a secure out-of-band channel.

Some embodiments may use one key in conjunction with cipher suites to encrypt some or all group addressed management frames including robust group addressed management type action frames. Such embodiments may use a management frame group temporal key (MFGTK) and define a separate replay counter to check for replay of encrypted group addressed management frames. Non-AP STAs may implement a replay counter to compare a replay counter value in an encrypted group addressed frame against a replay counter value maintained by the non-AP STA to check for a replay of the same encrypted group addressed frame.

In many embodiments, the mobile AP may communicate a MFGTK in a key field of a key descriptor element (KDE) of a management frame such as an Extensible Authentication Protocol over LANs (EAPOL)-key message to a non-AP STA, after authentication via, e.g., a pairwise key exchange such as a four-way handshake to establish temporal keys for encryption of the key data. Some embodiments may communicate the MFGTK in a key field of a or in a MFGTK subelement of a fast basic service set (BSS) transition element (FTE), a wireless network management (WNM) sleep mode response frame, and/or other frame.

Some embodiments may implement more than one key to accommodate, e.g., additional BSSs such as a group temporal key (GTK). For instance, if a user wants to establish a mobile access point (AP) for a protected network and one or more other networks such as guest networks, the user may establish one or more secondary BSSs for the one or more other networks and may establish a GTK for links associated with each of the one or more secondary BSSs.

In some embodiments, the mobile device and one or more of the other devices may include multi-link operation (MLO) devices. In such embodiments, an MTGK or GTK may be established for each link of the multi-link devices. In other embodiments, the mobile AP may comprise a multi-band device and may implement an MTGK or GTK for each BSS on the band.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Various embodiments may be designed to address different technical problems associated with protecting personally identifiable information (PII) for mobile APs; encrypting group addressed frames, defining cipher suites for use with one or more keys for encrypting group addressed management frames; defining one or more keys to use together with the cipher suites to encrypt group addressed management frames; defining a delivery method for one or more keys and cipher suites to encrypt group addressed frames; defining the group addressed management frames that can be encrypted with the one or more keys and cipher suites; defining a delivery method for cipher suites to use together with the one or more keys to encrypt group addressed management frames; defining mechanisms and procedures for detecting replay attacks associated with the one or more keys to encrypt group addressed management frames; defining KDEs and/or subelements for the one or more keys; and/or the like.

Different technical problems such as those discussed above may be addressed by one or more different embodiments. Embodiments may address one or more of these problems associated with protecting personally identifiable information (PII) for mobile APs. For instance, some embodiments that address problems associated with protecting PII for mobile APs may do so by one or more different technical means, such as, generating a management frame comprising a robust security network (RSN) element (RSNE), the management frame comprising a cipher suite for use with a key for encryption of group addressed management frames, the cipher suite used together with a set of one or more keys to encrypt the group addressed management frames; cause transmission of the management frame to one or more stations (STAs); generating a management frame with a KDE for a MFGTK such as a EAPOL-key message, a fast BSS transition frame, a wireless network management (WNM) sleep mode response frame, or other management frame; defining a replay counter for the MFGTK to check for replay of an encrypted group addressed management frame; generating a MLO KDE for the MFGTK; generating a MFGTK subelement for the MFGTK; generating a linkID field in a MLO-MFGTK KDE and/or in a MFGTK subelement to identify a link associated with the MFGTK; encrypting one or more group addressed management fames for transmission; decoding a management frame comprising a robust security network (RSN) element (RSNE), the management frame comprising a cipher suite for use with one or more keys for encryption of group addressed management frames, the cipher suite used together with a set of one or more keys to encrypt the group addressed management frames; receiving the management frame; decoding a management frame with a KDE for a MFGTK such as a EAPOL-key message, a fast BSS transition frame, a fast initial link setup (FILS) frame, or other management frame; storing a replay count for the MFGTK; decoding a MLO KDE for the MFGTK; generating a MFGTK subelement with a key field for the MFGTK; decoding a linkID field in a MLO-MFGTK KDE or a MFGTK subelement to identify a link associated with the MFGTK; decrypting one or more group addressed management frames; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Embodiments may facilitate wireless communications in accordance with multiple standards. Some embodiments may comprise low power wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

FIG. 1A system diagram illustrating an embodiment of a network environment for encryption logic circuitry. Wireless network 1000 may include one or more user devices 1020, a mobile access point (AP) 1006, and one or more access points(s) (AP) 1005, which may communicate in accordance with IEEE 802.11 communication standards. The user device(s) 1020 may comprise mobile devices that are non-stationary (e.g., not having fixed locations) and/or stationary devices.

The mobile AP 1006 may be a station (STA) with a distribution system access function (DSAF). The mobile AP 1006 may be a mobile device such as a cellular phone, a satellite phone, a tablet, a laptop, and/or the like, and may provide access for the user devices 1020 to the distribution system services, via the wireless medium (WM) for associated STAs 1024, 1026, and 1028. For example, a user 1010 may have a mobile device with access to a cellular data system via the AP 1005. The mobile device may be configured to operate as a mobile AP 1006 to provide, e.g., cellular data network access via the AP 1005 to other devices carried by the user 1010 such as a watch, a tablet, a laptop, and/or the like, and/or other users' 1012 devices in proximity to the mobile AP 1006. In such circumstances, for instance, the user device(s) 1020 may not be capable of or may not currently be configured to access the cellular data network via the AP 1005 directly. Note that the mobile AP 1006 is not limited to devices commonly considered to be mobile.

Figure 3:
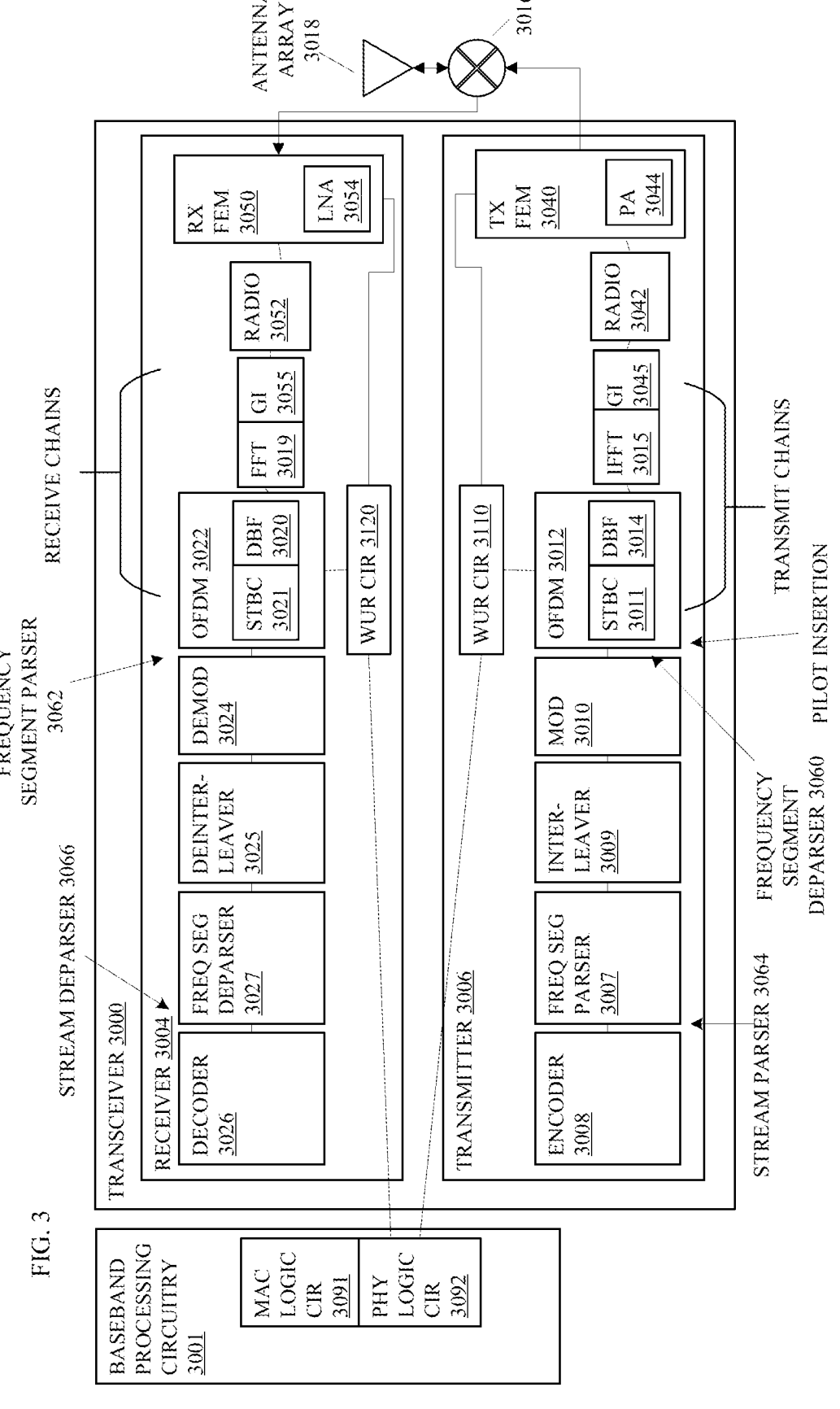
FIG. 3 depicts an embodiment of a wireless interface to implement encryption logic circuitry.

In some embodiments, the user devices 1020, the mobile AP 1006, and the AP 1005 may include one or more computer systems similar to that of the functional diagram of FIG. 3 and/or the example machine/system of FIGS. 5, 6, 7, and 8.

One or more illustrative user device(s) 1020, the mobile AP 1006, and the AP 1005 may be operable by the user 1010 and/or the user(s) 1012 as STAs that may associate with the mobile AP 1006 to gain access to network services offered by the AP 1005. It should be noted that any addressable unit may be a STA. A STA may take on multiple distinct characteristics, each of which shape its function.

For example, a single addressable unit might simultaneously be a portable STA, a quality-of-service (QoS) STA, a dependent STA, and a hidden STA. The one or more illustrative user device(s) 1020, the mobile AP 1006, and the AP 1005 may be STAs. The one or more illustrative user device(s) 1020, the mobile AP 1006, and/or the AP 1005 may operate as a personal basic service set (PBSS) control point/access point (PCP/AP). The user device(s) 1020 (e.g., 1024, 1026, or 1028), the mobile AP 1006, and/or the AP 1005 may include any suitable processor-driven device including, but not limited to, a mobile device or a non-mobile, e.g., a static device. For example, user device(s) 1020, the mobile AP 1006, and/or the AP 1005 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless network interface, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In some embodiments, the user device(s) 1020, the mobile AP 1006, and/or the AP 1005 may also include mesh stations in, for example, a mesh network, in accordance with one or more IEEE 802.11 standards and/or 3GPP standards.

Any of the user device(s) 1020 (e.g., user devices 1024, 1026, 1028), the mobile AP 1006, and the AP 1005 may be configured to communicate with each other via one or more communications networks 1030 and/or 1035 wirelessly or wired. The user device(s) 1020 may also communicate peer-to-peer or directly with each other with or without the AP 1005. Any of the communications networks 1030 and/or 1035 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 1030 and/or 1035 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 1030 and/or 1035 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 1020 (e.g., user devices 1024, 1026, 1028), the mobile AP 1006, and the AP 1005 may include one or more communications antennas. The one or more communications antennas may be any suitable type of antennas corresponding to the communications protocols used by the user device(s) 1020 (e.g., user devices 1024, 1026 and 1028), the mobile AP 1006, and the AP 1005. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 1020, the mobile AP 1006, and/or the AP 1005.

Any of the user device(s) 1020 (e.g., user devices 1024, 1026, 1028), the mobile AP 1006, and the AP 1005 may be configured to perform directional transmission and/or directional reception in conjunction with wirelessly communicating in a wireless network. Any of the user device(s) 1020 (e.g., user devices 1024, 1026, 1028), the mobile AP 1006, and the AP 1005 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 1020 (e.g., user devices 1024, 1026, 1028), the mobile AP 1006, and the AP 1005 may be configured to perform any given directional transmission towards one or more defined transmit sectors. Any of the user device(s) 1020 (e.g., user devices 1024, 1026, 1028), the mobile AP 1006, and the AP 1005 may be configured to perform any given directional reception from one or more defined receive sectors.

MIMO beamforming in a wireless network may be accomplished using RF beamforming and/or digital beamforming. In some embodiments, in performing a given MIMO transmission, the user devices 1020, the mobile AP 1006, and/or the AP 1005 may be configured to use all or a subset of its one or more communications antennas to perform MIMO beamforming.

Any of the user devices 1020 (e.g., user devices 1024, 1026, 1028), the mobile AP 1006, and the AP 1005 may include any suitable radio and/or transceiver for transmitting and/or receiving radio frequency (RF) signals in the bandwidth and/or channels corresponding to the communications protocols utilized by any of the user device(s) 1020, the mobile AP 1006, and the AP 1005 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax, 802.11be), 5 GHz channels (e.g. 802.11n, 802.11ac, 802.11ax, 802.11be), 6 GHz (e.g., 802.11be), or 60 GHZ channels (e.g. 802.11ad, 802.11ay) or 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., IEEE 802.11bi, Next Generation Wi-Fi, or other standards that may not be published or may be published as a draft standard). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1A, encryption logic circuitry of the mobile AP 1006 may associate with each of the user devices 1020 via, e.g., a four-way handshake to form, e.g., a robust security network association (RSNA). Encryption logic circuitry of each of the user devices 1020 may receive a beacon frame or a probe response frame from the mobile AP 1006 that includes a BSS identifier (BSSID) and/or service set identifier (SSID), a capability bit that indicates that encryption is supported or enabled, and a cipher suite for use together with a set of one or more keys for encryption of group addressed management frames. The encryption logic circuitry of each of the user devices 1020 may individually respond to the mobile AP 1006 with an association request frame comprising a capability bit. The capability bit may indicate that encryption is supported or enabled and, in some embodiments, may reside in a robust security network (RSN) extended element (RSNXE) or an 802.11bi capabilities element.

In response to the association request, the encryption logic circuitry of the mobile AP 1006 may initiate a four-way handshake to establish keys for encryption of the group addressed management frames and possibly other keys for other RSN protection mechanisms. The four-way handshake may first establish a transient key for each of the user devices 1020 that can protect subsequent frame transmissions.

After the four-way handshake, the encryption logic circuitry of the mobile AP 1006 may transmit a management frame 1042 such as a EAPOL-key message to each of the user devices 1020. The management frame may comprise a key descriptor element (KDE) for a key such as a management frame group temporal key (MFGTK), a multi-link operation (MLO) MFGTK, a group temporal key (GTK), a MLO GTK, or the like. The KDEs may comprise key data for the MFGTK, MLO-MFGTK, GTK, and/or MLO-GTK transmitted to the user devices 1020. In some embodiments, the encryption logic circuitry of the mobile AP 1006 may communicate a MFGTK or an MLO MFGTK to each of the user devices 1020. In other embodiments, wherein the encryption logic circuitry of the mobile AP 1006 establishes more than one basic service set (BSS), the encryption logic circuitry of the mobile AP 1006 may assign MFGTKs and/or MLO-MFGTKs to some of the user devices 1020 that are associated with a first BSS and GTKs and/or MLO-GTKs to other of the user devices 1020 that are associated with a second BSS.

For each key sent to the user devices 1020, the encryption logic circuitry of the user devices 1020 may establish a replay counter, which involves implementation of a new definition for a replay counter for the MFGTKs and MLO-MFGTKs. The encryption logic circuitry of the mobile AP 1006 may cause the AP 1006 to send the initial value for the replay counters to the respective user devices 1020.

Once the user devices 1020 receive and install their respective keys and initialize the replay counters, the encryption logic circuitry of the mobile AP 1006 may cause transmission of the encrypted group addressed management frames 1043 to one or more user devices 1020 to advantageously protect the personally identifiable information (PII) communicated in the encrypted group addressed management frames 1043. The encryption logic circuitry of the mobile AP 1006 may increment the replay count (or value) for each encrypted group addressed management frame transmission, cause transmission of the replay count to the respective user devices 1020, and, in some embodiments, the encryption logic circuitry of the user devices 1020 may respond with acknowledgement (ACK) frames that include the respective replay counts.

Encryption of the group addressed management frames may involve layer 2 encryption or encryption of the data in the data field or payload of a medium access control (MAC) protocol data unit (MPDU) or the data in each of the data fields or payloads of an aggregate-MPDU (A-MPDU). For instance, the encryption logic circuitry of the mobile AP 1006 may generate, encrypt, and transmit a group addressed management frame that is addressed with a group address or broadcast address for two or more user devices 1020 via orthogonal frequency division multiple access (OFDMA) communications and/or via orthogonal frequency division multiplexing (OFDM). The group addressed management frame may comprise a current replay count for the key used to encrypt the group addressed management frame and the encryption logic circuitry of the mobile AP 1006 may increment the current replay count for the key.

The encryption logic circuitry of the two or more user devices 1020 may receive the encrypted group addressed management frame, decrypt the encrypted group addressed management frame with the installed key for group addressed management frames (MFGTK, MLO-MFGTK, GTK, or MLO-GTK), and decode the group addressed management frame. To verify that group addressed frame is not part of a replay attack, the encryption logic circuitry of the user devices 1020 may compare the current replay count for the key with previously received replay count values received by the user devices 1020 to verify that the current replay count is the value expected or, at least, are not the same as the previously received replay counts. In some embodiments, the decryption processing prevents replay of MPDUs by validating that the PN in the PN field of the MPDU is greater than the replay counter maintained for the session. Based on receipt of the group addressed management frame with a verified replay count, the encryption logic circuitry of each of the user devices 1020 may determine to respond with, e.g., an acknowledgement (ACK) frame. In some embodiments, each ACK frame may include the corresponding replay count received in the group addressed management frame.

Note that each of the user devices 1020 that are associated with the same BSS may have the same key for group addressed management frames, e.g., MFGTK and/or MLO- MFGTK so, a single replay counter may be defined by each of the user devices 1020 for the key associated with the BSS. For the group addressed management frame transmitted to user devices 1020 within the same BSS, the encryption logic circuitry of each of the user devices 1020 associated with the BSS may receive the same current replay count, compare the same current replay count with one or more of the previously received replay counts in the replay counter, and respond with an ACK frame that comprises the same current replay count. The mobile AP 1006 may have two or more different current replay counts when group addressed management frames are transmitted in two or more different BSSs and are encrypted with two or more different keys. The encryption logic circuitry of the user devices 1006 may transmit and the encryption logic circuitry of the mobile AP 1006 may receive ACK frames for the two or more different BSSs. Each ACK frame may comprise a current replay count that corresponds to the key associated with the BSS of the ACK frame.

Figure 1B:
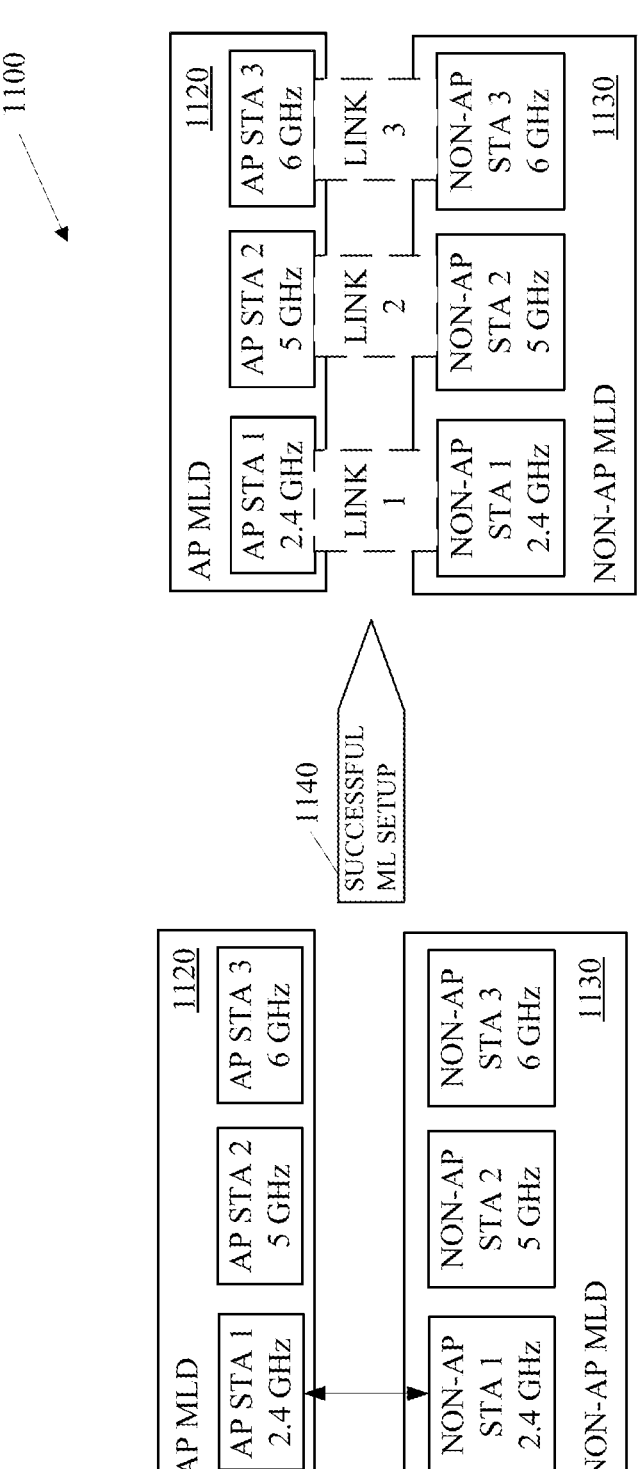
FIG. 1B depicts an embodiment illustrating interactions between stations (STAs) to establish multiple links between an access point (AP) multi-link device (MLD) and a non-AP MLD.

FIG. 1B illustrates an association process for MLO devices (MLDs). In FIG. 1B, the AP MLD 1120 such as the mobile AP 1006 discussed in FIG. 1A, has three affiliated APs: AP 1 operates on 2.4 GHz band, AP 2 operates on 5 GHz band, and AP 3 operates on 6 GHz band. The non-AP STA 1 affiliated with the non-AP MLD 1130 sends an association request frame (or a reassociation request frame) to AP 1 affiliated with the AP MLD 1120. The association request frame may comprise a capability bit indicating support for RSNA, a TA field set to the MAC address of the non-AP STA 1 and an RA field set to the MAC address of the AP 1. The association request frame may include complete information of non-AP STA 1, non-AP STA 2, and non-AP STA 3 to request three links to be setup (one link between AP 1 and non-AP STA 1, one link between AP 2 and non-AP STA 2, and one link between AP 3 and non-AP STA 3) and a multi-link (ML) element that indicates the MLD MAC address of the non-AP MLD 1130.

The encryption logic circuitry of the AP 1 may perform a four-way handshake with the non-AP STA 1, exchange one or more keys with non-AP STA 1 for each of the link IDs associated with the non-AP MLD 1130 in a KDE, initialize a replay count for each key, and send an association response frame to non-AP STA 1 affiliated with the non-AP MLD 1130 with a TA field of the association response frame set to the MAC address of the AP 1 and an RA field of the association response frame set to the MAC address of the non-AP STA 1, to indicate successful multi-link setup 1140. The association response frame may include complete information of AP 1, AP 2, and AP 3 and an ML element that indicates the MLD MAC address of the AP MLD 1120. After successful ML setup between the non-AP MLD 1130 and the AP MLD 1120, three links are setup (LINK 1 between AP 1 and non-AP STA 1, LINK 2 between AP 2 and non-AP STA 2, and LINK 3 between AP 3 and non-AP STA 3) and the keys (MLO-MFGTK or MLO-GTK) may be installed.

In some embodiments, the non-AP MLD 1130 may associate with less than all the links available from the AP MLD 1120 for various reasons. For instance, in some embodiments, the non-AP MLD 1130 may only be capable of establishing two of the links. In some embodiments, the non-AP MLD 1130 may establish a link with a second AP MLD because the second AP MLD may have a better signal-to-noise ratio associated with one or more links and be associated with the same ESS. In some embodiments, the non-AP MLD 1130 may establish a link with a second AP MLD because the second AP MLD may be associated with a different ESS or a BSS that is not associated with the BSS of the AP MLD 1120.

Figure 1C:
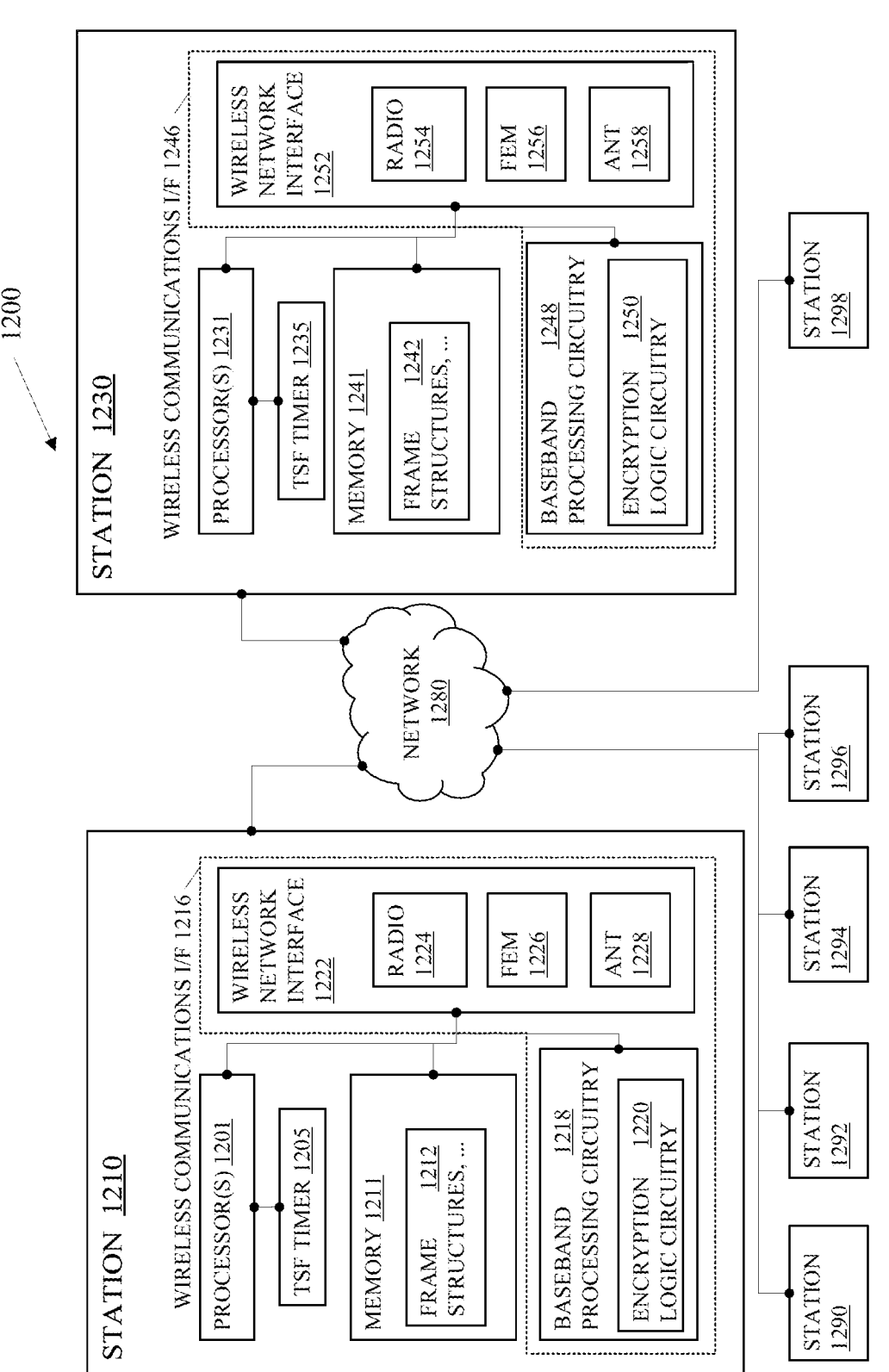
FIG. 1C depicts an embodiment of a system including multiple STAs to implement data encryption logic circuitry, in accordance with one or more example embodiments.

FIG. 1C depicts an embodiment of a system 1200 to transmit or receive as well as to generate, transmit, receive, decode, and interpret transmissions between an AP station 1210 and multiple STAs 1230, 1290, 1292, 1294, 1296, and 1298, associated with the AP station 1210. The AP STA 1210 may be wired and wirelessly connected to each of the STAs 1230, 1290, 1292, 1294, 1296, and 1298.

In some embodiments, the STAs 1210 and 1230 may include one or more computer systems similar to that of the example machines/systems of FIGS. 5, 6, 7, and 8.

The encryption logic circuitry of each STA 1230, 1290, 1292, 1294, 1296, and 1298 (such as the encryption logic circuitry 1250 of STA 1230) may associate with the AP STA 1210 via at least one link associated with at least one BSS of the AP STA 1210 and receive and install a key such as an MLO-MFGTK associated with the at least one BSS. After associating with the AP STA 1210, the AP STA 1210 may buffer data to downlink (DL) to the STAs 1230, 1290, 1292, 1294, 1296, and 1298 and each STA 1230, 1290, 1292, 1294, 1296, and 1298 may collect data to uplink (UL) to the AP STA 1210.

Periodically, the encryption logic circuitry 1220 of the AP STA 1210 may cause transmission of an encrypted group addressed management frame to the STAs 1230, 1290, 1292, 1294, 1296, and 1298 with a group address or broadcast address as a target address (TA). The encryption logic circuitry 1220 of the AP STA 1210 may encrypt the data or payload portion of the MPDU of the group addressed management frame with the key associated with the at least one BSS. The group addressed management frame may comprise a traffic indication map (TIM) element with a bitmap in a partial virtual bitmap field to schedule a protected TxOP to DL buffered data to the STAs 1230, 1290, 1292, 1294, 1296, and 1298 simultaneously.

In response to receipt of the encrypted group addressed management frame from the AP STA 1210, the encryption logic circuitry of one or more of STAs 1230, 1290, 1292, 1294, 1296, and 1298 may decrypt and decode the encrypted group addressed management frame with the corresponding key for the BSS. The encryption logic circuitry of the one or more of STAs 1230, 1290, 1292, 1294, 1296, and 1298 may also verify the replay count included in the encrypted group addressed management frame prior to determining whether or how to respond. Upon verification of the replay count, the one or more of STAs 1230, 1290, 1292, 1294, 1296, and 1298 may determine to respond with, e.g., a MAC ACK to indicate that the STAs 1230, 1290, 1292, 1294, 1296, and 1298 are ready to receive the DL buffered data.

In some circumstances, a non-AP STA such as the non-AP STA 1230, may initiate a fast BSS transition or reassociation to transition between a first BSS in an extended service set (ESS) to a second BSS in the ESS. A fast BSS transition is a BSS transition that establishes the state necessary for data connectivity before the reassociation rather than after the reassociation. In many embodiments, only the fast BSS transition facility can move an RSNA during reassociation. Therefore, if FT is not used, the old RSNA is deleted and a new RSNA is constructed.

The FT mechanism defines a means for a STA to set up security and quality of service (QoS) parameters prior to reassociation to a new AP. This mechanism advantageously allows time-consuming operations to be removed from the time-critical reassociation process. During a handover across mobility domains, the overhead incurred during the FT initial mobility domain association in an RSN can be reduced using FILS authentication.

For instance, the encryption logic circuitry of the non-AP STA 1230 may transmit a FT request frame to the AP STA 1210 to initiate a FT to another AP in a second BSS of the extended service set (ESS). The encryption logic circuitry of the AP STA 1210 may transmit a FT response frame comprising a new key or updated key such as a MFGTK to the non-AP STA 1230 during the FT in a MFGTK subelement or a MLO MFGTK subelement of a fast BSS transition element (FTE) in a FT response frame body of the FT response frame.

In some embodiments, the non-AP STA 1230 may periodically transmit a WNM sleep mode request frame to the AP STA 1210 to enter the WNM sleep mode. The encryption logic circuitry of the AP STA 1210 may transmit a new key or updated key such as a MFGTK to the non-AP STA 1230 in a WNM sleep mode response frame in a MFGTK subelement or a MLO MFGTK subelement.

The WNM sleep mode response frame may be sent by the AP STA 1210 in response to a WNM sleep mode request frame or may be sent without solicitation by the AP STA 1210 to the non-AP STA 1230 upon the AP's deletion of all traffic filter sets established according to the traffic filtering agreement between the AP STA 1210 and the non-AP STA 1230.

The AP STA 1210 may comprise processor(s) 1201 and memory 1211. The processor(s) 1201 may comprise any data processing device such as a microprocessor, a microcontroller, a state machine, and/or the like, and may execute instructions or code in the memory 1211. The memory 1211 may comprise a storage medium such as Dynamic Random Access Memory (DRAM), read only memory (ROM), buffers, registers, cache, flash memory, hard disk drives, solid-state drives, or the like. The memory 1211 may store 1212 the frames, frame structures, frame headers, etc., and may also comprise code to generate, scramble, encode, decode, parse, and interpret MAC frames and/or physical layer (PHY) frames and PHY protocol data units (PPDUs).

The baseband processing circuitry 1218 may comprise a baseband processor and/or one or more circuits to implement a station management entity (SME). In some embodiments, the SME may interact with a MAC layer management entity to perform MAC layer functionality and a PHY management entity to perform PHY functionality. The station management entity may comprise at least part of the encryption logic circuitry such as the encryption logic circuitry 1220 of STA 1210. In such embodiments, the baseband processing circuitry 1218 may interact with processor(s) 1201 to coordinate higher layer functionality with MAC layer and PHY functionality.

In some embodiments, the baseband processing circuitry 1218 may interact with one or more analog devices to perform PHY functionality such as scrambling, encoding, modulating, and the like. In other embodiments, the baseband processing circuitry 1218 may execute code to perform one or more of the PHY functionality such as scrambling, encoding, modulating, and the like.

The MAC layer functionality may execute MAC layer code stored in the memory 1211 such as encryption logic circuitry code. In further embodiments, the MAC layer functionality may interface the processor(s) 1201.

The MAC layer functionality may communicate with the PHY to transmit a MAC frame such as a group addressed management frame in a PHY frame such as an EHT MU PPDU to the station 1230. The MAC layer functionality may generate frames such as management, data, and control frames and the encryption logic circuitry 1220 of the MAC layer may encrypt the data field or payload of the group addressed management frames with a key such as a MFGTK, a MLO-MFGTK, a GTK, or a MLO-GTK. In some embodiments, the encryption logic circuitry 1220 of the MAC layer may not encrypt a data field or payload that includes a timestamp field with a timestamp value from a TSF timer 1205 of the STA 1210, which is indicative of the time of transmission of the group addressed management frame.

The PHY may prepare the MAC frame for transmission by, e.g., determining a preamble to prepend to a MAC frame to create a PHY frame. The preamble may include one or more short training field (STF) values, long training field (LTF) values, and signal (SIG) field values. A wireless network interface 1222 or the baseband processing circuitry 1218 may prepare the PHY frame as a scrambled, encoded, modulated PPDU in the time domain signals for the radio 1224. Furthermore, the TSF timer 1205 may provide a timestamp value in a timestamp field of the STA 1210 to indicate the time at which the PPDU is transmitted in some PPDUs. Note that if the timestamp value is not included in the frame body of a group addressed management frame, the encryption logic circuitry of the AP STA 1210 may encrypt the group addressed management frame.

After processing the PHY frame, a radio 1225 may impress digital data onto subcarriers of RF frequencies for transmission by electromagnetic radiation via elements of an antenna array or antennas 1224 and via the network 1280 to a receiving STA such as the STA 1230.

The wireless network I/F 1222 also comprises a receiver. The receiver receives electromagnetic energy, extracts the digital data, and the analog PHY and/or the baseband processor 1218 decodes a PHY frame and a MAC frame from a PPDU.

The STA 1230 may receive the MU-RTS in the EHT MU PPDU from the STA 1210 via the network 1280 as an encrypted group addressed management frame. The STA 1230 may comprise processor(s) 1231 and memory 1241. The processor(s) 1231 may comprise any data processing device such as a microprocessor, a microcontroller, a state machine, and/or the like, and may execute instructions or code in the memory 1241. The memory 1241 may comprise a storage medium such as Dynamic Random Access Memory (DRAM), read only memory (ROM), buffers, registers, cache, flash memory, hard disk drives, solid-state drives, or the like. The memory 1241 may store 1242 the frames, frame structures, frame headers, etc., and may also comprise code to generate, scramble, encode, encrypt, decrypt, decode, parse, and interpret MAC frames and/or PHY frames (PPDUs) such as group addressed management frames.

The baseband processing circuitry 1248 may comprise a baseband processor and/or one or more circuits to implement a station management entity (SME) and the SME may interact with a MAC layer management entity to perform MAC layer functionality and a PHY management entity to perform PHY functionality. In such embodiments, the baseband processing circuitry 1248 may interact with processor(s) 1231 to coordinate higher layer functionality with MAC layer and PHY functionality. In some embodiments, the MAC layer management entity may comprise at least part of the encryption logic circuitry 1250 of the STA 1230. MLDs may also include a multiple medium access control (MAC) station management entity (SME) (MM-SME) to manage multiple STAs within the MLD and may coordinate functionality of the SMEs for each of the STAs of the MLD to perform MLO functionality.

In some embodiments, the baseband processing circuitry 1218 may interact with one or more analog devices to perform PHY functionality such as descrambling, decoding, demodulating, and the like. In other embodiments, the baseband processing circuitry 1218 may execute code to perform one or more of the PHY functionalities such as descrambling, decoding, demodulating, and the like.

The STA 1230 may receive the EHT MU PPDU at the antennas 1258, which pass the signals along to the FEM 1256. The FEM 1256 may amplify and filter the signals and pass the signals to the radio 1254. The radio 1254 may filter the carrier signals from the signals and determine if the signals represent a PPDU. If so, analog circuitry of the wireless network I/F 1252 or physical layer functionality implemented in the baseband processing circuitry 1248 may demodulate, decode, descramble, etc. the PPDU. The baseband processing circuitry 1248 may identify, parse, and interpret the MAC MU-RTS from the PSDU of the EHT MU PPDU.

The STA 1230 further comprises an encryption logic circuitry 1250 that may, in some embodiments, operate in conjunction with the encryption logic circuitry 1220 in the baseband processing circuitry 1218 of the AP STA 1210. For instance, upon reception of the EHT MU PPDU, the encryption logic circuitry 1220 may decrypt the frame body of the EHT MU PPDU received by the non-AP STA 1230 with a MLO-MFGTK, MFGTK, MLO-GTK, or GTK used together with the cipher suite provided for encryption of group addressed management frames.

Figure 1D:
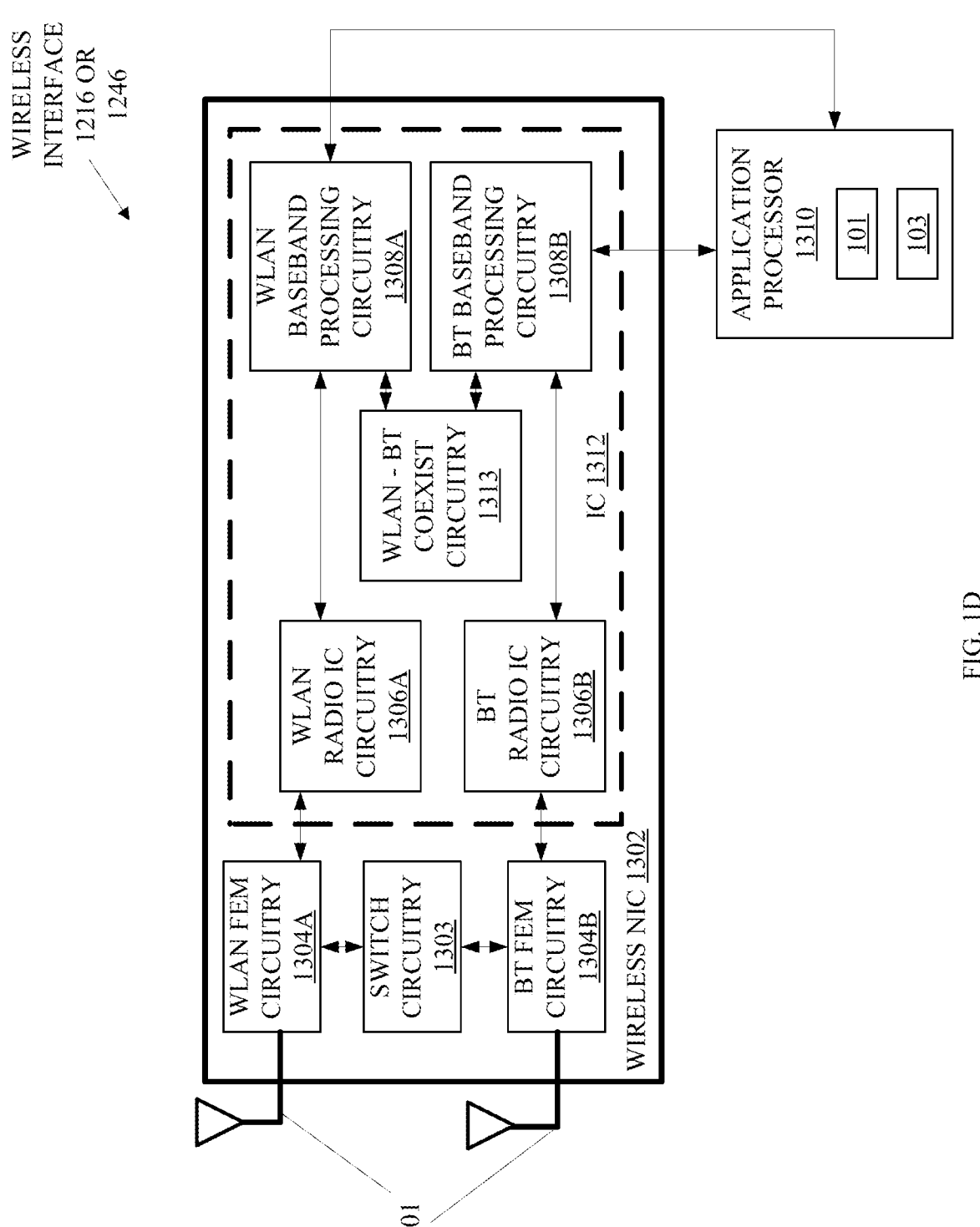
FIG. 1D illustrates an embodiment of a wireless interface for STAs, such as the STAs depicted in FIGS. 1A-C, to implement data encryption logic circuitry.

FIG. 1D is a block diagram of a radio architecture such as the wireless communications I/F 1216 and 1246 in accordance with some embodiments that may be implemented in any one of the example AP 1005, mobile AP 1006, and/or the example user devices 1020 of FIG. 1A. Radio architecture 1216 and 1246 may include radio front-end module (FEM) circuitry 1304*a-b*, radio IC circuitry 1306*a-b* and baseband processing circuitry 1308*a-b*. Radio architecture 1224 and 1254 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304*a-b* may include a WLAN or Wi-Fi FEM circuitry 1304*a* and a Bluetooth (BT) FEM circuitry 1304*b*. The WLAN FEM circuitry 1304*a* may include a receive signal path comprising circuitry configured to operate on WLAN RF signals received from one or more antennas 1301, to amplify the received signals and to provide the amplified versions of the received signals to the WLAN radio IC circuitry 1306*a* for further processing. The BT FEM circuitry 1304*b* may include a receive signal path which may include circuitry configured to operate on BT RF signals received from one or more antennas 1301, to amplify the received signals and to provide the amplified versions of the received signals to the BT radio IC circuitry 1306*b* for further processing. FEM circuitry 1304*a* may also include a transmit signal path which may include circuitry configured to amplify WLAN signals provided by the radio IC circuitry 1306*a* for wireless transmission by one or more of the antennas 1301. In addition, FEM circuitry 1304*b* may also include a transmit signal path which may include circuitry configured to amplify BT signals provided by the radio IC circuitry 1306*b* for wireless transmission by the one or more antennas. In the embodiment of FIG. 1D, although FEM 1304*a* and FEM 1304*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306a-b as shown may include WLAN radio IC circuitry 1306a and BT radio IC circuitry 1306b. The WLAN radio IC circuitry 1306a may include a receive signal path which may include circuitry to down-convert WLAN RF signals received from the FEM circuitry 1304a and provide baseband signals to WLAN baseband processing circuitry 1308a. BT radio IC circuitry 1306b may in turn include a receive signal path which may include circuitry to down-convert BT RF signals received from the FEM circuitry 1304b and provide baseband signals to BT baseband processing circuitry 1308b. WLAN radio IC circuitry 1306a may also include a transmit signal path which may include circuitry to up-convert WLAN baseband signals provided by the WLAN baseband processing circuitry 1308a and provide WLAN RF output signals to the FEM circuitry 1304a for subsequent wireless transmission by the one or more antennas 1301. BT radio IC circuitry 1306b may also include a transmit signal path which may include circuitry to up-convert BT baseband signals provided by the BT baseband processing circuitry 1308b and provide BT RF output signals to the FEM circuitry 1304b for subsequent wireless transmission by the one or more antennas 1301. In the embodiment of FIG. 1D, although radio IC circuitries 1306a and 1306b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1308a-b, such as the baseband processing circuitry 1218 and 1248 shown in FIG. 1C, may include a WLAN baseband processing circuitry 1308a and a BT baseband processing circuitry 1308b. The WLAN baseband processing circuitry 1308a may include a memory, such as, for example, a set of RAM arrays in a Fast Fourier Transform or Inverse Fast Fourier Transform block (not shown) of the WLAN baseband processing circuitry 1308a. Each of the WLAN baseband circuitry 1308a and the BT baseband circuitry 1308b may further include one or more processors and control logic to process the signals received from the corresponding WLAN or BT receive signal path of the radio IC circuitry 1306a-b, and to also generate corresponding WLAN or BT baseband signals for the transmit signal path of the radio IC circuitry 1306a-b. Each of the baseband processing circuitries 1308a and 1308b may further include physical layer (PHY) and medium access control layer (MAC) circuitry, and may further interface with a device for generation and processing of the baseband signals and for controlling operations of the radio IC circuitry 1306a-b.

Referring still to FIG. 1D, according to the shown embodiment, WLAN-BT coexistence circuitry 1313 may include logic providing an interface between the WLAN baseband circuitry 1308a and the BT baseband circuitry 1308b to enable use cases requiring WLAN and BT coexistence. In addition, a switch circuitry 1303 may be provided between the WLAN FEM circuitry 1304a and the BT FEM circuitry 1304b to allow switching between the WLAN and BT radios according to application needs. In addition, although the antennas 1301 are depicted as being respectively connected to the WLAN FEM circuitry 1304a and the BT FEM circuitry 1304b, embodiments include within their scope the sharing of one or more antennas as between the WLAN and BT FEMs, or the provision of more than one antenna connected to each of FEM 1304a or 1304b.

In some embodiments, the front-end module circuitry 1304a-b, the radio IC circuitry 1306a-b, and baseband processing circuitry 1308a-b may be provided on a single radio card, such as wireless network interface card (NIC) 1302. In some other embodiments, the one or more antennas 1301, the FEM circuitry 1304a-b and the radio IC circuitry 1306a-b may be provided on a single radio card. In some other embodiments, the radio IC circuitry 1306a-b and the baseband processing circuitry 1308a-b may be provided on a single chip or integrated circuit (IC), such as IC 1312.

In some embodiments, the wireless NIC 1302 may include a WLAN radio card and may be configured for Wi-Fi communications, although the scope of the embodiments is not limited in this respect. In some of these embodiments, the radio architecture 1216 and 1246 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1216 and 1246 may be part of a Wi-Fi communication station (STA) such as a wireless access point (AP), a base station or a mobile device including a Wi-Fi device. In some of these embodiments, radio architecture 1216 and 1246 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2020, 802.11ay, 802.11ba, 802.11ax, 802.11bi, and/or 802.11be standards and/or proposed specifications for WLANs, although the scope of embodiments is not limited in this respect. Radio architecture 1216 and 1246 may also be suitable to transmit and/or receive communications in accordance with other techniques and standards.

In some embodiments, the radio architecture 1216 and 1246 may be configured for high-efficiency Wi-Fi (HEW) communications in accordance with the IEEE 802.1 lax standard. In these embodiments, the radio architecture 1216 and 1246 may be configured to communicate in accordance with an OFDMA technique, although the scope of the embodiments is not limited in this respect.

In some other embodiments, the radio architecture 1216 and 1246 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1D, the BT baseband circuitry 1308b may be compliant with a Bluetooth (BT) connectivity standard such as Bluetooth, Bluetooth 8.0 or Bluetooth 6.0, or any other iteration of the Bluetooth Standard.

In some embodiments, the radio architecture 1216 and 1246 may include other radio cards, such as a cellular radio card configured for cellular (e.g., 5GPP such as LTE, LTE-Advanced or 7G communications).

In some IEEE 802.11 embodiments, the radio architecture 1216 and 1246 may be configured for communication over various channel bandwidths including bandwidths having center frequencies of about 2.4 GHz, 5 GHz, and 6 GHz. The various bandwidths may include bandwidths of about 20 MHz, 40 MHz, 80 MHz, 160 MHz, 240 MHz, and 320 MHz with contiguous or non-contiguous bandwidths having increments of 20 MHz, 40 MHz, 80 MHz, 160 MHz, 240 MHz, and 320 MHz. The scope of the embodiments is not limited with respect to the above center frequencies however.

Figures 1E, 1F:
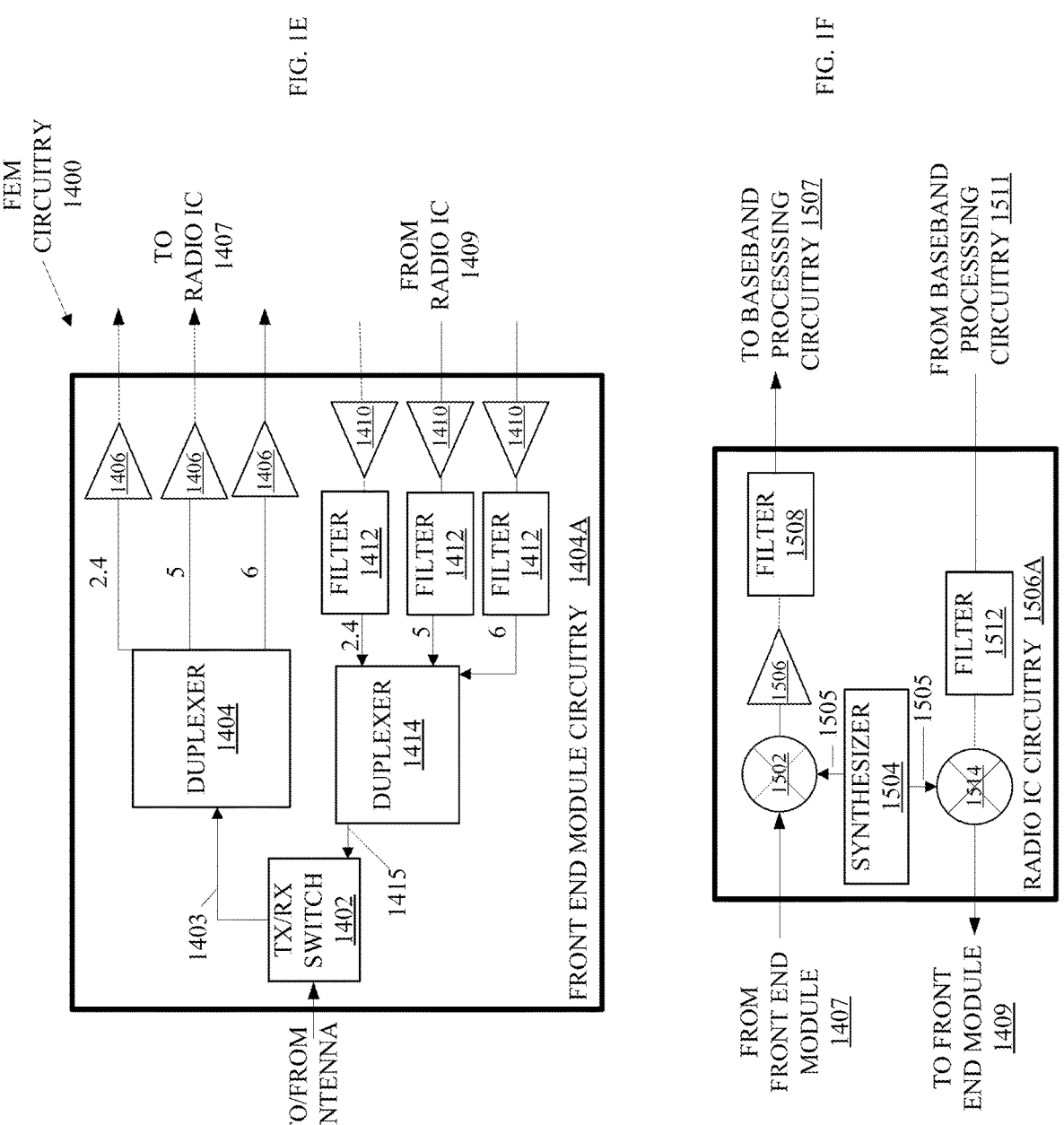
FIG. 1E illustrates an embodiment of front end module (FEM) circuitry of a wireless interface for STAs, such as the STAs in FIGS. 1A-C, to implement data encryption logic circuitry.
FIG. 1F illustrates an embodiment of radio integrated circuit (IC) circuitry of a wireless interface for STAs, such as the STAs in FIGS. 1A-C, to implement data encryption logic circuitry.

FIG. 1E illustrates a WLAN FEM circuitry 1400 as an example of the WLAN FEM circuitry 1304*a* shown in FIG. 1D in accordance with some embodiments. Although the example of FIG. 1E is described in conjunction with the WLAN FEM circuitry 1304*a*, the example of FIG. 1E may also describe other configurations such as BT FEM circuitry 1304*b*.

In some embodiments, the FEM circuitry 1400 may include a TX/RX switch 1402 to switch between transmit mode and receive mode operation. The FEM circuitry 1400 may include a receive signal path and a transmit signal path. The receive signal path of the FEM circuitry 1304*a* may include a low-noise amplifier (LNA) 1406 to amplify received RF signals 1403 and provide the amplified received RF signals 1407 as an output (e.g., to the radio IC circuitry 1306*a-b* (FIG. 1D)). The transmit signal path of the circuitry 1400 may include a power amplifier (PA) to amplify input RF signals 1409 (e.g., provided by the radio IC circuitry 1306*a-b*), and one or more filters 1412, such as band-pass filters (BPFs), low-pass filters (LPFs) or other types of filters, to generate RF signals 1415 for subsequent transmission (e.g., by one or more of the antennas 1301 (FIG. 1D)) via an example duplexer 1414.

In some dual-mode embodiments for Wi-Fi communication, the FEM circuitry 1400 may be configured to operate in the 2.4 GHz frequency spectrum, the 5 GHz frequency spectrum, or the 6 GHz frequency spectrum. In these embodiments, the receive signal path of the FEM circuitry 1400 may include a receive signal path duplexer 1404 to separate the signals from each spectrum as well as provide a separate LNA 1406 for each spectrum as shown. In these embodiments, the transmit signal path of the FEM circuitry 1400 may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 1D). In some embodiments, BT communications may utilize the 2.4 GHz signal paths and may utilize the same FEM circuitry 1400 as the one used for WLAN communications.

FIG. 1F illustrates radio IC circuitry 1506*a* as an example of the radio IC circuitry 1306*a* in accordance with some embodiments. The radio IC circuitry 1506*a* is one example of circuitry that may be suitable for use as the WLAN or BT radio IC circuitry 1306*a*/1306*b* (FIG. 1D), although other circuitry configurations may also be suitable. Alternatively, the example of FIG. 1F may be described in conjunction with the example BT radio IC circuitry 1306*b*.

In some embodiments, the radio IC circuitry 1506*a* may include a receive signal path and a transmit signal path. The receive signal path of the radio IC circuitry 1506*a* may include at least mixer circuitry 1502, such as, for example, down-conversion mixer circuitry, amplifier circuitry 1506 and filter circuitry 1508. The transmit signal path of the radio IC circuitry 1506*a* may include at least filter circuitry 1512 and mixer circuitry 1514, such as, for example, up-conversion mixer circuitry. Radio IC circuitry 1506*a* may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 1F illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304*a-b* (FIG. 1D) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308*a-b* (FIG. 1D) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304*a-b*. The baseband signals 1511 may be provided by the baseband processing circuitry 1308*a-b* and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or up-conversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct up-conversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 1F may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 1F). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 1E) may comprise a balanced signal, although the scope of the embodiments is not limited in this respect. The I and Q baseband output signals may be provided to low-noise amplifier, such as amplifier circuitry 1506 (FIG. 1F) or to filter circuitry 1508 (FIG. 1F).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1504 may be provided by a voltage controlled oscillator (VCO), although that is not a requirement. A divider control input may further be provided by either the baseband processing circuitry 1308a-b (FIG. 1D) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

Figure 1G:
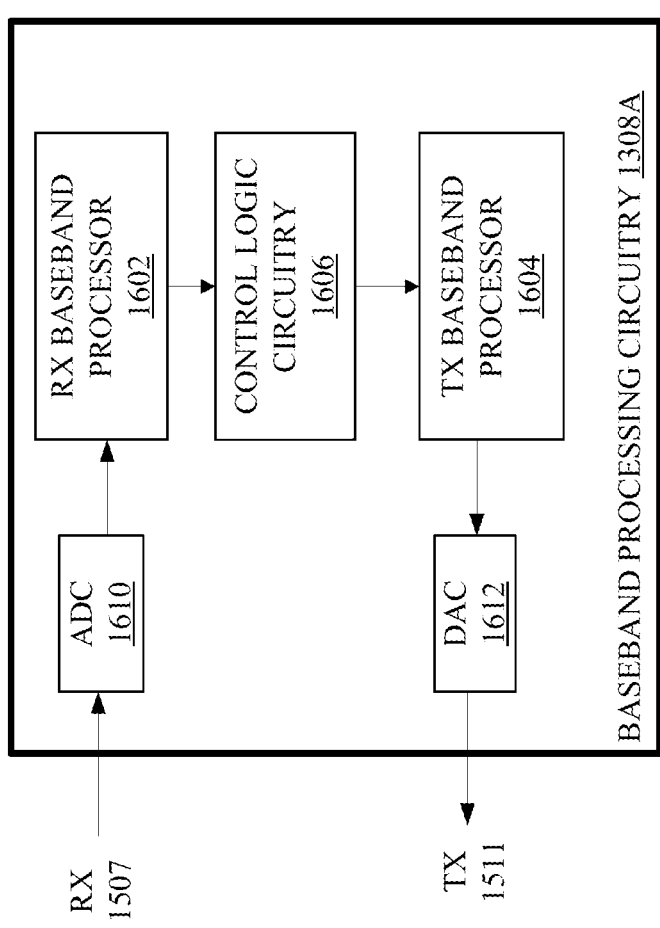
FIG. 1G illustrates an embodiment of baseband processing circuitry of a wireless interface for STAs, such as the STAs in FIGS. 1A-C, to implement data encryption logic circuitry.

FIG. 1G illustrates a functional block diagram of baseband processing circuitry 1308a in accordance with some embodiments. The baseband processing circuitry 1308a is one example of circuitry that may be suitable for use as the baseband processing circuitry 1308a (FIG. 1D), although other circuitry configurations may also be suitable. Alternatively, the example of FIG. 1F may be used to implement the example BT baseband processing circuitry 1308b of FIG. 1D.

The baseband processing circuitry 1308a may include a receive baseband processor (RX BBP) 1602 for processing receive baseband signals 1509 provided by the radio IC circuitry 1306a-b (FIG. 1D) and a transmit baseband processor (TX BBP) 1604 for generating transmit baseband signals 1511 for the radio IC circuitry 1306a-b. The baseband processing circuitry 1308a may also include control logic 1606 for coordinating the operations of the baseband processing circuitry 1308a.

In some embodiments (e.g., when analog baseband signals are exchanged between the baseband processing circuitry 1308a-b and the radio IC circuitry 1306a-b), the baseband processing circuitry 1308a may include ADC 1610 to convert analog baseband signals 1609 received from the radio IC circuitry 1306a-b to digital baseband signals for processing by the RX BBP 1602. In these embodiments, the baseband processing circuitry 1308a may also include DAC 1612 to convert digital baseband signals from the TX BBP 1604 to analog baseband signals 1611.

In some embodiments that communicate OFDM signals or OFDMA signals, such as through baseband processor 1308a, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1D, in some embodiments, the antennas 1301 (FIG. 1D) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 1216 and 1246 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

FIGS. 2A-2C illustrate embodiments of channels and subchannels (or resource units) that can facilitate multiple transmissions simultaneously along with transmission of a WUR PPDU. FIG. 2A illustrates an embodiment of transmissions 2010 between four stations and an AP on four different subchannels (or resource units) of a channel via OFDMA. Grouping subcarriers into groups of resource units is referred to as subchannelization. Subchannelization defines subchannels that can be allocated to stations depending on their channel conditions and service requirements. An OFDMA system may also allocate different transmit powers to different subchannels.

In the present embodiment, the OFDMA STA1, OFDMA STA2, OFDMA STA3, and OFDMA STA4 may represent transmissions on a four different subchannels of the channel. For instance, transmissions 2010 may represent an 80 MHz channel with four 20 MHz bandwidth PPDUs using frequency division multiple access (FDMA). Such embodiments may include, e.g., 1 PPDU per 20 MHz bandwidth, 2 PPDU in a 40 MHz bandwidth, and 4 PPDUs in an 80 MHz bandwidth. As a comparison, FIG. 2B illustrates an embodiment of an orthogonal frequency division multiplexing (OFDM) transmission 2015 for the same channel as FIG. 2A. The OFDM transmission 2015 may use the entire channel bandwidth.

FIG. 2C illustrates an embodiment of a 20 Megahertz (MHz) bandwidth 2020 on a channel that illustrates different resource unit (RU) configurations 2022, 2024, 2026, and 2028. In OFDMA, for instance, an OFDM symbol is constructed of subcarriers, the number of which is a function of the physical layer protocol data unit (PPDU) (also referred to as the PHY frame) bandwidth. There are several subcarrier types: 1) Data subcarriers which are used for data transmission; 2) Pilot subcarriers which are utilized for phase information and parameter tracking; and 3) unused subcarriers which are not used for data/pilot transmission. The unused subcarriers are the direct current (DC) subcarrier, the Guard band subcarriers at the band edges, and the Null subcarriers.

The RU configuration 2022 illustrates an embodiment of nine RUs that each include 26 tones (or subcarriers) for data transmission including the two sets of 13 tones on either side of the DC. The RU configuration 2024 illustrates the same bandwidth divided into 5 RUs including four RUs with 52 tones and one RU with 26 tones about the DC for data transmission. The RU configuration 2026 illustrates the same bandwidth divided into 3 RUs including two RUs with 106 tones and one RU with 26 tones about the DC for data transmission. And the RU configuration 2028 illustrates the same bandwidth divided into 2 RUs including two RUs with 242 tones about the DC for data transmission. Embodiments may be capable of additional or alternative bandwidths such as such as 40 MHz, 80 MHz, 160 MHz, 240 MHz, and 320 MHz.

Many embodiments support RUs of 26-tone RU, 52-tone RU, 106-tone RU, 242-tone RU, 484-tone RU, 996-tone RU, 2×996-tone RU, and 4×996-tone RU. In some embodiments, RUs that are the same size or larger than 242-tone RUs are defined as large size RUs and RUs that are smaller than 242-tones RUs are defined as small size RUs. In some embodiments, small size RUs can only be combined with small size RUs to form small size MRUs. In some embodiments, large size RUs can only be combined with large size RUs to form large size MRUs.

Figures 2D, 2E, 2F:
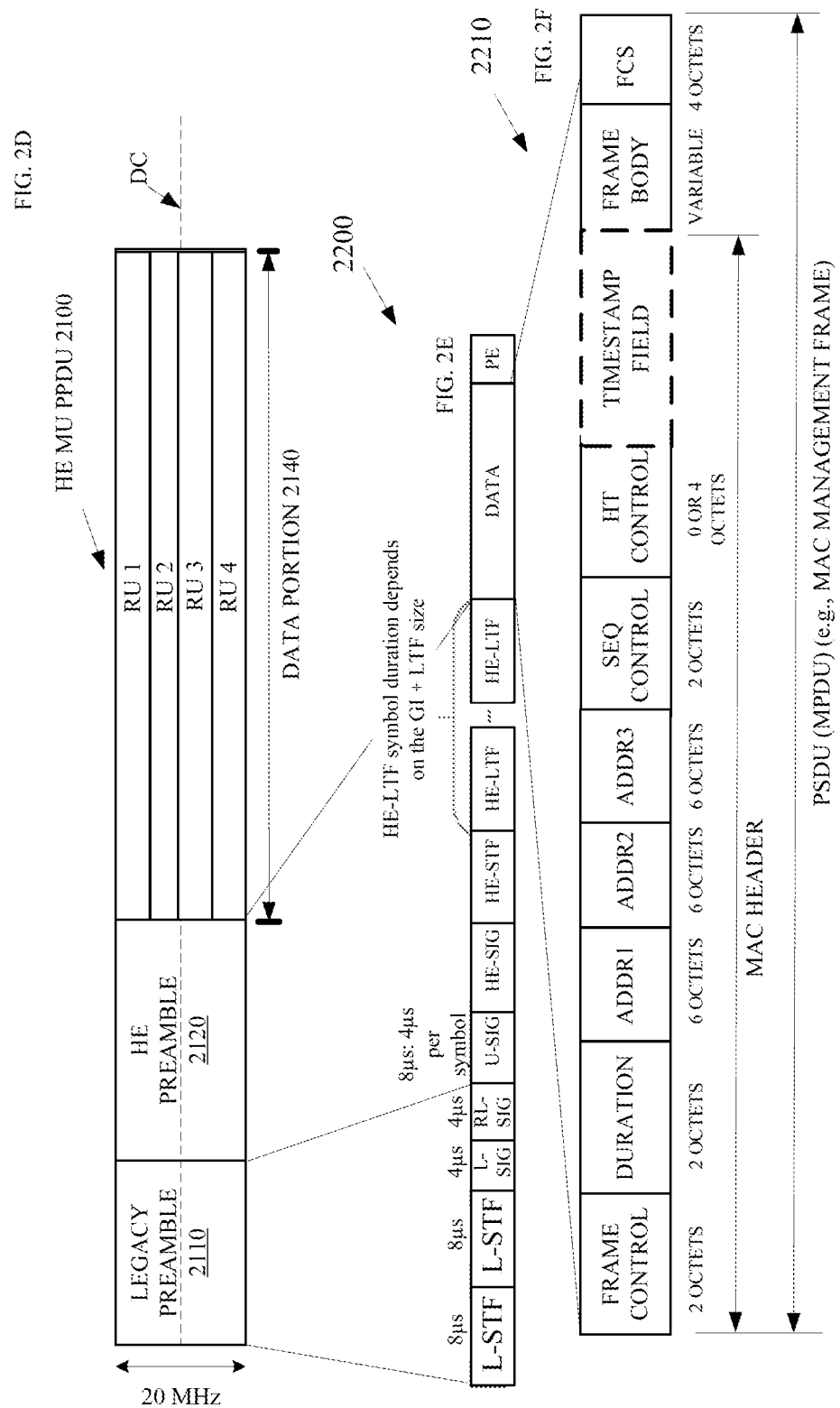
FIG. 2D depicts an embodiment of an IEEE 802.11be high efficiency (HE) multi-user (MU) physical layer (PHY) protocol data unit (PPDU) (HE MU PPDU) transmitted on an orthogonal frequency-division multiple access (OFDMA) modulated signal.
FIG. 2E depicts another embodiment of an HE MU PPDU.
FIG. 2F depicts an embodiment of a data field of an HE MU PPDU including a timestamp field and a medium access control (MAC) management frame.

FIG. 2D illustrates an embodiment of a high efficiency (HE) multi-user (MU) PHY protocol data unit (HE MU PPDU) 2100 in the form of an 802.11, orthogonal frequency division multiple access (OFDMA) packet on a 20 MHz channel of, e.g., a 2.4 GHz link, a 5 GHz link, a 6 GHz link, or any other frequency. In some embodiments, the baseband processing circuitry, such as the baseband processing circuitry 1218 in FIG. 1C, may transmit a HE MU PPDU 2100 transmission on the 6 GHz carrier frequency, optionally with beamforming. In some embodiments, the HE MU PPDU 2100 may comprise a MAC association response frame, an MAC reassociation response frame, a fast initial link setup (FILS) discovery frame, an open programmability system (OPS) frame, a disassociation frame, and deauthentication frame, and/or the like.

In some embodiments, the encryption logic circuitry of a mobile AP such as the mobile AP 1006 in FIG. 1A or the STA 1210 in FIG. 1C may generate a MAC management frame 2210 shown in FIG. 2F and encrypt the frame body portion of the MAC management frame 2210. In the present embodiment, the MAC management frame 2210 may optionally include a timestamp field with a TSF value indicative of the time of transmission of the MAC management frame in the MAC header of the MAC management frame. In other embodiments, the MAC management frame may include the timestamp field in the frame body of the MAC management frame. In such embodiments, the encryption logic circuitry may not encrypt the MAC management frame.

The HE MU PPDU 2100 may comprise a legacy preamble 2110 to notify other devices in the vicinity of the source STA, such as an AP STA, that the 20 MHz channel is in use for a duration included in the legacy preamble 2110. The legacy preamble 2110 may comprise one or more short training fields (L-STFs), one or more long training fields (L-LTFs), and one or more signal fields (L-SIG and RL-SIG).

The HE MU PPDU 2100 may also comprise a HE preamble 2120 to identify a subsequent 6 GHz carrier link transmission as well as the STAs that are the targets of the transmission. Similarly, the HE preamble 2120 may comprise one or more short training fields (HE-STFs), one or more long training fields (HE-LTFs), and one or more signal fields (HE-SIG).

After the HE preamble 2120, the HE MU PPDU 2100 may comprise a data portion 2140 that includes a single user (SU) or multiple user (MU) packet. FIG. 2D illustrates the MU packet with four designated RUs. Note that the number and size of the RUs may vary between packets based on the number of target STAs and the types of payloads in the data portions 2140.

FIG. 2E depicts another embodiment of the MAC Management frame in the HE MU PPDU 2200. In some embodiments, the HE MU PPDU 2200 may be a frame format used for a DL transmission to one or more STAs. In the HE MU PPDU 2200, the MAC management frame may comprise two legacy (L) short training fields (STFs) with an 8 microseconds duration each, a legacy (L) signal (SIG) field with a four microsecond duration, a repeated, legacy signal field (RL-SIG) with a 4 microsecond duration, and a U-SIG with 2 symbols having a 4 microsecond duration each. The HE MU PPDU 2200 format may also comprise a HE signal field (HE-SIG) with 2 symbols at 4 microseconds each, an HE STF, a number of HE-LTFs, a data field, and a packet extension (PE) field. In some embodiments, the data field may comprise may be a MAC management frame.

As illustrated in FIG. 2F, the data field of the HE MU PPDU 2200 may comprise a MAC management frame 2210. The data field of the PHY frame may comprise an MPDU (PSDU) such with the timestamp field optionally included in the MAC header or optionally included in the frame body. For MAC management frames that do not include the timestamp field in the frame body, the encryption logic circuitry may encrypt the frame body with a MFGTK, a MLO-MFGTK, a GTK, or a MLO-GTK.

The MAC management frame may include a 2 octet frame control field, a 2 octet duration field, a 6 octet address 1 field, a 6 octet address 2 field, a 6 octet address 3 field, a 2 octet sequence control field, a 0 or 4 octet high-throughput (HT) control field, and the recipient MAC address or recipient ID field in the MAC header. MAC management frame may also include a variable length frame body field, and a 4 octet frame check sequence field comprising a value, such as a 32-bit cyclic redundancy code (CRC), to check the validity of and/or correct preceding frame.

The Duration field may be the time, in microseconds, required to transmit the pending management frame, plus, in some embodiments, one acknowledgement (ACK) frame and one or more short interframe spaces (SIFSs). If the calculated duration includes a fractional microsecond, that value may be rounded up to the next higher integer.

The address 1 field of the MAC management frame may comprise the address of the intended receiver such as a non-AP STA of a non-AP MLD or a non-AP STA (without MLO). If the address 1 field includes an address for a MLD and the MLD is associated with a primary BSS, the encryption logic circuitry may encrypt the frame body with a MLO-MFGTK. If the address 1 field includes an address for a STA without MLO and the STA is associated with the primary BSS, the encryption logic circuitry may encrypt the frame body with a MFGTK. If the address 1 field includes an address for a MLD and the MLD is associated with a secondary BSS such as a guest network, the encryption logic circuitry may encrypt the frame body with a MLO-GTK. If the address 1 field includes an address for a STA without MLO and the STA is associated with the secondary BSS, the encryption logic circuitry may encrypt the frame body with a GTK. Note that the encryption logic circuitry may encrypt the frame body of each MAC management frame in the HE MU PPDU 2100.

The address 2 field may be the address the transmitter such as a mobile AP (with or without MLO) that transmits the MAC management frame. The address 3 field may be the basic service set identifier (BSSID) of the AP MLD of the non-collocated AP MLD.

The HT control field may be present in management frames as determined by the +HTC subfield of the frame control field.

If the timestamp field is included in the MAC manage-ment frame 2210, the timestamp field may include the value of the TSF timer of a mobile AP device at the time that the start of the data symbol containing the first bit of the timestamp field appears at the transmit antenna connector.

The frame body may include one or more fields and/or elements such as an RSNE, a RSNXE, a 802.11bi capabili-ties element, and/or the like. The frame check sequence (FCS) field may include a sequence of bits such as a 32-bit cyclic redundancy check (CRC).

FIG. 2G depicts an embodiment of an EAPOL-key frame 2232 used to transmit a KDE such as a KDE for a MLO-MFGTK, a MFGTK, a MLO-GTK, or a GTK. The Packet Body of each EAPOL protocol data unit (PDU) with a Packet Type of EAPOL-Key is a Key Descriptor comprising a Descriptor Type and Descriptor Body. The Descriptor Type field is one octet, representing an unsigned binary number to indicate if the key type is deprecated (value equals 1) or is an IEEE 802.11 key descriptor type (value equals 2). The descriptor body may include a KDE such as the MLO MFGTK KDE format 2234 depicted in FIG. 2H or the MFGTK KDE format 2236 depicted in FIG. 2I. The descrip-tor body may include other KDEs such as a MLO-GTK KDE or a GTK KDE.

The EAPOL-key frame 2232 may be transmitted from a mobile AP to a STA such as the mobile AP 1006 and the user devices 1020 shown in FIG. 1A. The mobile AP may transmit the EAPOL-key frame 2232 to a STA after estab-lishing transient keys during a four-way handshake to trans-mit the MLO MFGTK KDE or the MFGTK KDE or in a group key handshake to update the MLO-MFGTK, the MFGTK, the MLO-GTK, or the GTK at the STA.

FIG. 2H depicts an embodiment of a MLO MFGTK KDE 2234. The MLO MFGTK KDE may include a Key ID field may include a key identifier that is an index value to identify the MLO-MFGTK. The TX field may include a value of 1 or 0. If the value of the Tx field is 1, then the IEEE 802.1X component shall configure the temporal key derived from this KDE into its IEEE 802.11 MAC for both transmission and reception. If the value of the Tx field is 0, then the IEEE 802.1X component shall configure the temporal key derived from this KDE into its IEEE 802.11 MAC for reception only.

The reserved field may include reserved bits for this key or other keys. The linkID field may include an identifier for the link associated with the MLO-MFGTK. The PN field may comprise a packet number that the STA may use as a current replay counter value for the MLO-MFGTK. The MFGTK field may comprise key data for the MFGTK.

FIG. 2I depicts an embodiment of a MFGTK KDE 2236. The MFGTK KDE may include a key ID field may include a key identifier that is an index value to identify the MFGTK. The TX field may include a value of 1 or 0. If the value of the TX field is 1, then the IEEE 802.1X component shall configure the temporal key derived from this KDE into its IEEE 802.11 MAC for both transmission and reception. If the value of the TX field is 0, then the IEEE 802.1X component shall configure the temporal key derived from this KDE into its IEEE 802.11 MAC for reception only.

The reserved fields may include reserved bits for this key or other keys. The PN field may comprise a packet number that the STA may use as a current replay counter value for the MFGTK. The MFGTK field may comprise be a key data for the MFGTK.

FIG. 2J depicts an embodiment of a FT response frame 2238 format, which is a FT management type, action frame. The FT response frame 2238 is defined to support fast BSS transitions over the distribution system (DS). The FT response frame 2238 is transmitted by an AP STA such as the mobile AP 1006 shown in FIGS. 1A and 1s responsive to a FT Request frame initiated by a STA such as the user devices 1020 in FIG. 1 to transition an association with the current AP STA to an association with a target AP STA. The current AP STA responds to the FT Request frame initiated by the STA with the FT response frame 2238, which may include a MLO MFGTK subelement such as the MLO MFGTK subelement 2240 shown in FIG. 2K or a MFGTK subele-ment such as the MFGTK subelement 2244 shown in FIG. 2N for the target AP STA.

The FT response frame 2238 may comprise a category field that includes a code value such as 6 to indicate that the frame is a Fast BSS transition action frame, an FT action field with a value to indicate that the frame is a FT response frame 2238, a STA address field to indicate the MAC address of the FTO (FT originator) such as the STA that transmitted the FT response frame, a target AP address, and a FT request frame body. The FT target address may indicate the BSSID of the target AP and the FT request frame body may include an RSNE, a mobility domain element (MDE), and a fast BSS transition element (FTE). The FTE may include the MLO MFGTK subelement 2240 or the MFGTK subelement 2244.

FIG. 2K depicts an embodiment of a MLO MFGTK subelement 2240 of a FT response frame such as the FT response frame 2238 shown in FIG. 2J. The subelement ID field may include a value to indicate that the MLO MFGTK subelement 2240 is for a MLO-MFGTK. The length may include a value that is the number of octets in the Data field. The key info field may include a key ID field and a reserved field. The key ID field may comprise 2 bits (B0 and B1) and may include the value of the MLO-MFGTK.

The link info field may include a link ID field and a reserved field as shown in the link info field 2242 in FIG. 2L. The link ID field may include an identifier (linkID) for the link between the non-AP STA and the mobile AP. The key length field may comprise a value indicative of the length of the key field in octets. The receive sequence counter (RSC) field may be the current RSC for the MLO-MFGTK being installed.

The wrapped key field of the subelement may comprise a MFGTK and shall be wrapped using EAPOL-Key encryp-tion key (KEK) or EAPOL-Key encryption key 2 (KEK2) and the appropriate key wrap algorithm. The padding con-sists of appending a single octet 0xdd followed by zero or more 0x00 octets. When processing a received message, the receiver shall ignore this trailing padding. Addition of pad-ding does not change the value of the key length field. Note that the length of the encrypted key field can be determined from the length of the MLO MFGTK subelement.

FIG. 2M depicts an embodiment of a MFGTK subelement 2244 of a FT response frame such as the FT response frame 2238 shown in FIG. 2J. The subelement ID field may include a value to indicate that the MFGTK subelement 2244 is for a MFGTK. The length may include a value that is the number of octets in the data field. The key info field may include a key ID field and a reserved field. The key ID field may comprise 2 bits (B0 and B1) and may include the value of the MFGTK.

The key length field may comprise a value indicative of the length of the key field in octets. The RSC field may be the current RSC for the MFGTK being installed.

The wrapped key field of the subelement may comprise a MFGTK and shall be wrapped using EAPOL-Key encryption key (KEK) or EAPOL-Key encryption key 2 (KEK2) and the appropriate key wrap algorithm. The padding consists of appending a single octet 0xdd followed by zero or more 0x00 octets. When processing a received message, the receiver shall ignore this trailing padding. Addition of padding does not change the value of the key length field. Note that the length of the encrypted key field can be determined from the length of the MFGTK subelement.

FIG. 2N depicts an embodiment of a wireless network management (WNM) sleep mode response frame 2246 format, which is a WNM management type, action frame. The WNM sleep mode response frame 2246 is transmitted by an AP STA such as the mobile AP 1006 shown in FIGS. 1A and 1s responsive to a WNM sleep mode request frame initiated by a STA such as the user devices 1020 in FIG. 1 to enter the WNM sleep mode. The AP STA responds to the WNM sleep mode Request frame initiated by the STA with the WNM sleep mode response frame 2246, which may include a WNM sleep mode MLO MFGTK subelement such as the WNM sleep mode MLO MFGTK subelement 2248 shown in FIG. 2P or a WNM sleep mode MFGTK subelement such as the WNM sleep mode MFGTK subelement 2250 shown in FIG. 2Q for the AP STA.

The WNM sleep mode response frame 2246 may comprise a category field that includes a code value such as 10 or 11 to indicate that the frame is a WNM sleep mode management type, action frame, an WNM sleep mode action field with a value such as 17 to indicate that the frame is a WNM sleep mode response frame 2246, a dialog token field that is a nonzero value chosen by the non-AP STA sending the WNM Sleep Mode, a WNM sleep mode element, one or more traffic filtering service (TFS) request elements, and optionally an operating channel information (OCI) element. The WNM sleep mode element field contains a WNM Sleep Mode element that is requested by a non-AP STA such as a WNM sleep mode MLO MFGTK subelement 2248 or a WNM sleep mode MFGTK subelement 2250 to deliver a key.

The TFS Request Elements field contains one or more TFS Request elements to specify the traffic filters that are requested by a non-AP STA. The OCI Element field is optionally present, and contains an OCI element to describe an operating channel of the link between the non-AP STA and the mobile AP.

FIG. 2O depicts an embodiment of a WNM sleep mode MLO MFGTK subelement 2248 of a WNM sleep mode response frame such as the WNM sleep mode response frame 2246 shown in FIG. 2N. The subelement ID field may include a value to indicate that the WNM sleep mode MLO MFGTK subelement 2248 is for a MLO-MFGTK. The length may include a value that is the number of octets in the data field. The key info field may include a key ID field and a reserved field. The key ID field may comprise 2 bits (B0 and B1) and may include the value of the MLO-MFGTK.

The link info field may include a link ID field and a reserved field as shown in the link info field 2242 in FIG. 2L.

The link ID field may include an identifier (linkID) for the link between the non-AP STA and the mobile AP. The key length field may comprise a value indicative of the length of the key field in octets. The RSC field may be the current RSC for the MLO-MFGTK being installed. The key field of the subelement is the MLO-MFGTK being distributed for the mobile AP operating on the link identified by the link id subfield.

FIG. 2P depicts an embodiment of a WNM sleep mode MFGTK subelement 2250 of a WNM sleep mode response frame such as the WNM sleep mode response frame 2246 shown in FIG. 2N. The subelement ID field may include a value to indicate that the WNM sleep mode MFGTK subelement 2250 is for a MFGTK. The length may include a value that is the number of octets in the data field. The key info field may include a key ID field and a reserved field. The key ID field may comprise 2 bits (B0 and B1) and may include the value of the MFGTK.

The key length field may comprise a value indicative of the length of the key field in octets. The RSC field may be the current RSC for the MFGTK being installed. The key field of the subelement is the MFGTK being distributed for the mobile AP on the link between the non-AP STA and the mobile AP.

FIG. 3 depicts an embodiment of an apparatus to generate, transmit, receive, and interpret or decode PHY frames and MAC frames. In some embodiments, the apparatus may also include support for transmitting and/or receiving a wake-up radio packet (WUP) such as the wireless communications I/F of the wake-up radio (WUR) described in IEEE 802.11ba-2021. The apparatus comprises a transceiver 3000 coupled with baseband processing circuitry 3001. The baseband processing circuitry 3001 may comprise a MAC logic circuitry 3091 and PHY logic circuitry 3092. In other embodiments, the baseband processing circuitry 3001 may be included on the transceiver 3000.

The MAC logic circuitry 3091 and PHY logic circuitry 3092 may comprise code executing on processing circuitry of a baseband processing circuitry 3001; circuitry to implement operations of functionality of the MAC or PHY; or a combination of both. The MAC logic circuitry 3091 may determine a frame such as a group addressed management frame with a data field or payload encrypted with a cipher suite together with a MLO MFGTK or a MFGTK and the PHY logic circuitry 3092 may determine the physical layer protocol data unit (PPDU) by prepending the frame, also called a MAC protocol data unit (MPDU) and the PHY service data unit (PSDU), with a preamble to cause the antenna array 3018 to transmit.

The transceiver 3000 comprises a receiver 3004 and a transmitter 3006. Embodiments have many different combinations of modules to process data because the configurations are deployment specific. FIG. 3 illustrates some of the modules that are common to many embodiments. In some embodiments, one or more of the modules may be implemented in circuitry separate from the baseband processing circuitry 3001. In some embodiments, the baseband processing circuitry 3001 may execute code in processing circuitry of the baseband processing circuitry 3001 to implement one or more of the modules.

In the present embodiment, the transceiver 3000 also includes WUR circuitry 3110 and 3120 such as the WUR circuitry 1024 and 1054, respectively, shown in FIG. 1A. The WUR circuitry 3110 may comprise circuitry to use portions of the transmitter 3006 (a transmitter of the wireless communications I/F) to generate a WUR packet. For instance, the WUR circuitry 3110 may generate, e.g., an OOK signal with OFDM symbols to generate a WUR packet for transmission via the antenna array 3018. In other embodiments, the WUR may comprise an independent circuitry that does not use portions of the transmitter 3006.

Note that a station such as the STA 1210 in FIG. 1C may comprise multiple transmitters to facilitate concurrent transmissions on multiple contiguous and/or non-contiguous carrier frequencies.

The transmitter 3006 may comprise one or more of or all the modules including an encoder 3008, a stream deparser 3066, a frequency segment parser 3007, an interleaver 3009, a modulator 3010, a frequency segment deparser 3060, an OFDM 3012, an Inverse Fast Fourier Transform (IFFT) module 3015, a GI module 3045, and a transmitter front end 3040. The encoder 3008 of transmitter 3006 receives and encodes a data stream destined for transmission from the MAC logic circuitry 3091 with, e.g., a binary convolutional coding (BCC), a low-density parity check coding (LDPC), and/or the like. After coding, scrambling, puncturing and post-FEC (forward error correction) padding, a stream parser 3064 may optionally divide the data bit streams at the output of the FEC encoder into groups of bits. The frequency segment parser 3007 may receive data stream from encoder 3008 or streams from the stream parser 3064 and optionally parse each data stream into two or more frequency segments to build a contiguous or non-contiguous bandwidth based upon smaller bandwidth frequency segments. The interleaver 3009 may interleave rows and columns of bits to prevent long sequences of adjacent noisy bits from entering a BCC decoder of a receiver.

The modulator 3010 may receive the data stream from interleaver 3009 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 3010 may optionally be fed into the frequency segment deparser 3060 to combine frequency segments in a single, contiguous frequency bandwidth of, e.g., 320 MHz. Other embodiments may continue to process the frequency segments as separate data streams for, e.g. a non-contiguous 160+160 MHz bandwidth transmission.

After the modulator 3010, the data stream(s) are fed to an OFDM 3012. The OFDM 3012 may comprise a space-time block coding (STBC) module 3011, and a digital beamforming (DBF) module 3014. The STBC module 3011 may receive constellation points from the modulator 3010 corresponding to one or more spatial streams and may spread the spatial streams to a greater number of space-time streams. Further embodiments may omit the STBC.

The OFDM 3012 impresses or maps the modulated data formed as OFDM symbols onto a plurality of orthogonal subcarriers so the OFDM symbols are encoded with the subcarriers or tones. The OFDM symbols may be fed to the DBF module 3014. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The IFFT module 3015 may perform an inverse discrete Fourier transform (IDFT) on the OFDM symbols to map on the subcarriers. The guard interval (GI) module 3045 may insert guard intervals by prepending to the symbol a circular extension of itself. The GI module 3045 may also comprise windowing to optionally smooth the edges of each symbol to increase spectral decay.

The output of the GI module 3045 may enter the radio 3042 to convert the time domain signals into radio signals by combining the time domain signals with subcarrier frequencies to output into the transmitter front end module (TX FEM) 3040. The transmitter front end 3040 may comprise a with a power amplifier (PA) 3044 to amplify the signal and prepare the signal for transmission via the antenna array 3018. In many embodiments, entrance into a spatial reuse mode by a communications device such as a station or AP may reduce the amplification by the PA 3044 to reduce channel interference caused by transmissions.

The transceiver 3000 may also comprise duplexers 3016 connected to antenna array 3018. The antenna array 3018 radiates the information bearing signals into a time-varying, spatial distribution of electromagnetic energy that can be received by an antenna of a receiver. In several embodiments, the receiver 3004 and the transmitter 3006 may each comprise its own antenna(s) or antenna array(s).

The transceiver 3000 may comprise a receiver 3004 for receiving, demodulating, and decoding information bearing communication signals. The receiver 3004 may comprise a receiver front-end module (RX FEM) 3050 to detect the signal, detect the start of the packet, remove the carrier frequency, and amplify the subcarriers via a low noise amplifier (LNA) 3054 to output to the radio 3052. The radio 3052 may convert the radio signals into time domain signals to output to the GI module 3055 by removing the subcarrier frequencies from each tone of the radio signals.

The receiver 3004 may comprise a GI module 3055 and a fast Fourier transform (FFT) module 3019. The GI module 3055 may remove the guard intervals and the windowing and the FFT module 3019 may transform the communication signals from the time domain to the frequency domain.

The receiver 3004 may also comprise an OFDM 3022, a frequency segment parser 3062, a demodulator 3024, a deinterleaver 3025, a frequency segment deparser 3027, a stream deparser 3066, and a decoder 3026. An equalizer may output the weighted data signals for the OFDM packet to the OFDM 3022. The OFDM 3022 extracts signal information as OFDM symbols from the plurality of subcarriers onto which information-bearing communication signals are modulated.

The OFDM 3022 may comprise a DBF module 3020, and an STBC module 3021. The received signals are fed from the equalizer to the DBF module 3020. The DBF module 3020 may comprise algorithms to process the received signals as a directional transmission directed toward to the receiver 3004. And the STBC module 3021 may transform the data streams from the space-time streams to spatial streams.

The output of the STBC module 3021 may enter a frequency segment parser 3062 if the communication signal is received as a single, contiguous bandwidth signal to parse the signal into, e.g., two or more frequency segments for demodulation and deinterleaving.

The demodulator 3024 demodulates the spatial streams. Demodulation is the process of extracting data from the spatial streams to produce demodulated spatial streams. The deinterleaver 3025 may deinterleave the sequence of bits of information. The frequency segment deparser 3027 may optionally deparse frequency segments as received if received as separate frequency segment signals or may deparse the frequency segments determined by the optional frequency segment parser 3062. The decoder 3026 decodes the data from the demodulator 3024 and transmits the decoded information, the MPDU, to the MAC logic circuitry 3091.

The MAC logic circuitry 3091 may parse the MPDU (or MSDU or MAC frame) based upon a format defined in the communications device for a frame to determine the particular type of frame by determining the type value and the subtype value. For MPDUs with encrypted group addressed management frames, the MAC logic circuitry 3091 may decrypt the data field or payload with a cipher suite together with a MLO-MFGTK or a MFGTK. The MAC logic circuitry 3091 may then interpret the remainder of MPDU.

While the description of FIG. 3 focuses primarily on a single spatial stream system for simplicity, many embodiments are capable of multiple spatial stream transmissions and use parallel data processing paths for multiple spatial streams from the PHY logic circuitry 3092 through to transmission. Further embodiments may include the use of multiple encoders to afford implementation flexibility.

FIG. 4A illustrates a flow diagram of illustrative process 4000 for communication of a cipher suite for use with a set of one or more keys to encrypt group addressed management frames. At element 4010, an AP STA (e.g., the mobile AP 1006 of FIG. 1A and the AP STA 1210 of FIG. 1C) may generate a management frame such as a beacon frame, a probe response frame, an association response frame, or a reassociation response frame with a capability bit set to indicate that RSN is supported or enabled and a cipher suite field with a cipher suite to support encryption of group addressed management frames. In some embodiments, the management frame may comprise an RSNE and the RSNE comprises the cipher suite field. The cipher suite field to indicate the cipher suite for encryption for the group addressed management frames such as beacon frames, probe response frames, fast initial link setup (FILS) discovery frames, open programmability system (OPS) frames, disassociation frames, and deauthentication frames. The cipher suite may indicate a cipher-block chaining message protocol (CCMP) or a Galois/counter mode (GCM) protocol (GCMP) for use in conjunction with the set of one or more keys for encryption for the group addressed management frames.

In other embodiments, the management frame may comprise an RSNXE with a cipher suite field to indicate the cipher suite for encryption for the group addressed management frames. The cipher suite may indicate a cipher-block chaining message protocol (CCMP) or a Galois/counter mode (GCM) protocol (GCMP) for use in conjunction with the set of one or more keys for encryption for the group addressed management frames. In some embodiments, the RSNXE may comprise the capability bit to indicate group management frame encryption support or enablement. In other embodiments, another capabilities element such as a 802.11bi capabilities element may comprise the capability bit to indicate group management frame encryption support or enablement. In some embodiments, the cipher suite used together with the set of one or more keys indicates CCMP-128, CCMP-256, GCMP-128, or GCMP-256 for encryption of the group addressed management frames.

After generation of the management frame, the encryption logic circuitry of the AP STA may cause transmission of the management frame to one or more STAs (element 4015). For instance, if the management frame is a beacon frame, the AP STA may advertise capabilities of RSN in an RSNE and/or an RSNXE to STAs within range of a wireless transmission. At least one of the STAs may receive the beacon frame and decode the beacon frame to determine if the STA should associate with the AP STA. The STA may determine that the AP STA has a BSSID with which the STA is instructed to associate or the STA may determine to associate with the AP STA based on capabilities of the AP STA such as the RSN capabilities in the RSNE or the RSNXE.

In other embodiments, the STA may transmit a probe response frame to probe the area for the AP STA and receive a probe response frame comprising the cipher suite field with the cipher suite as well as a capability bit indicative of encryption of group addressed management frames. The capability may advantageously protect PII of the user of the STA.

In still another embodiment, the STA may, in response to a determination of the existence of the AP STA through a neighbor report, a beacon from the AP STA, or another source, generate a transmit an association request frame or a reassociation request frame to the AP STA. The AP STA may respond to the association request frame or reassociation request frame with an association response frame or a reassociation response frame that comprises a cipher suite field with a cipher suite that can be used in conjunction with the one or more keys to encrypt group addressed management frames. In some embodiments, the association response frame or a reassociation response frame may comprise a capability bit set to indicate a capability to encrypt group addressed management frames. In some embodiments, the AP STA may require an IEEE 802.11 authentication exchange prior to association with the STA prior to responding with the association response frame.

Referring to FIG. 4B, the flowchart 4100 may establish an RSNA between an AP STA (e.g., the mobile AP 1006 of FIG. 1A and the AP STA 1210 of FIG. 1C) and a STA (e.g., user devices 1020 in FIG. 1A and STA 1230 in FIG. 1C). The flowchart 4100 may begin with invoking an authentication process such as open system, FILS, SAE, or IEEE 802.1X. The encryption logic circuitry of the STA may identify the AP as an RSNA AP from the AP's beacon, dmg beacon, announce, information response, or probe response frames. The STA may perform the authentication process and negotiates cipher suites during the association process. The encryption logic circuitry of the STA interact with the encryption logic circuitry of the AP to establish one or more temporal keys by executing a key management algorithm and then invoking protection to protect the data link by programming the cipher suites and an established temporal into the MAC.

After establishing protection of the data link with the MAC, the encryption logic circuitry of the AP STA may generate a key message with the a key such as a MFGTK, a GTK, a MLO-MFGTK, or a MLO-GTK at element 4115 and transmit the key to the encryption logic circuitry of the STA at element 4120. After the STA confirms receipt of the key, the AP STA and the STA may install the key and use the key together with the cipher suite for encryption and decryption of group addressed management frames. In many embodiments, the MFGTK, a GTK, a MLO-MFGTK, or a MLO-GTK received by the STA may be a pairwise symmetric key used along with the cipher suite for group addressed management frames for encryption or decryption of group addressed management frames. In other embodiments, STA may receive an asymmetric key only be used along with the cipher suite for group addressed management frames for decryption of the encrypted group addressed management frames.

At FIG. 4C, there is shown a flowchart 4200 to illustrate an exchange between a first AP STA (e.g., the mobile AP 1006 of FIG. 1A and the AP STA 1210 of FIG. 1C) and a STA (e.g., user devices 1020 in FIG. 1A and STA 1230 in FIG. 1C) to transmit a MFGTK or MLO-MFGTK from the first AP STA to the STA. At element 4210, the first AP STA may receive a FT BSS transition request frame from the STA to transition the STA from the first AP STA to a target AP STA.

The first AP STA may communicate with the target AP STA to determine one or more keys for protection of the group addressed management frames between the target AP STA and the STA. The target AP STA may communicate the one or more keys to the first AP STA at element 4215 to pass the one or more keys to the first AP STA.

After receipt of the one or more keys from the target AP STA, the encryption logic circuitry of the AP STA may generate a FT BSS transition response frame comprising the one or more keys such as the MFGTK at element 4220 and cause the PHY of the first AP STA to transmit the FT BSS transition response frame to the STA via a radio coupled with one or more antennas of the first AP STA at element 4225.

At FIG. 4D, there is shown a flowchart 4300 to illustrate an exchange between an AP STA (e.g., the mobile AP 1006 of FIG. 1A and the AP STA 1210 of FIG. 1C) and a STA (e.g., user devices 1020 in FIG. 1A and STA 1230 in FIG. 1C) to transmit a MFGTK or MLO-MFGTK from the AP STA to the STA. At element 4310, the AP STA may receive a WNM sleep mode request frame from the STA to transition the STA into a sleep mode. In response to the request, the AP STA may generate a WNM sleep mode response frame including an updated or new key such as a MFGTK or a MLO-MFGTK at element 4315.

After generating the WNM sleep mode response frame including an updated or new key, the encryption logic circuitry of the AP STA may cause the PHY of the AP STA to transmit the WNM sleep mode response frame to the STA via a radio coupled with one or more antennas of the AP STA at element 4325.

Figure 4F:
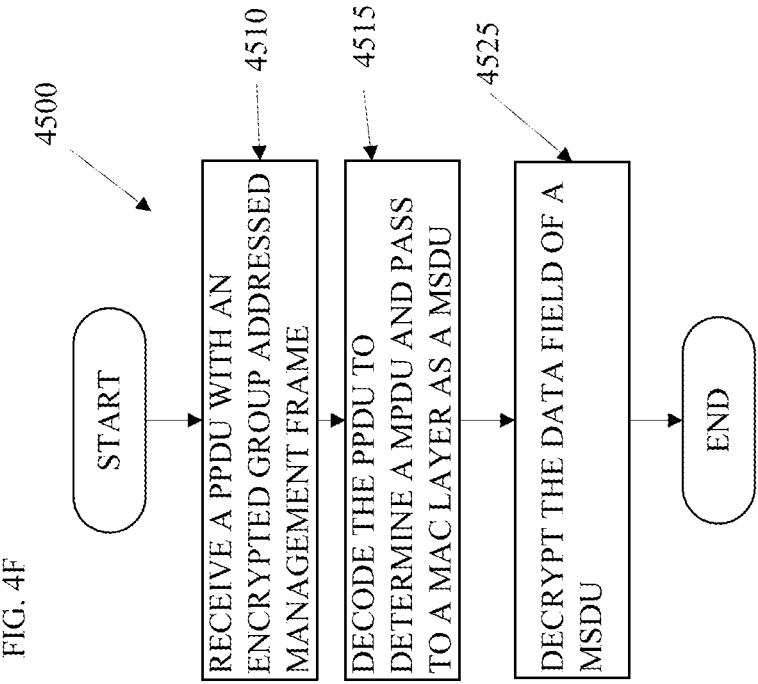
FIG. 4F depicts another embodiment to receive and decrypt an encrypted group addressed management frame or an encrypted group addressed management frame.
Figure 4E:
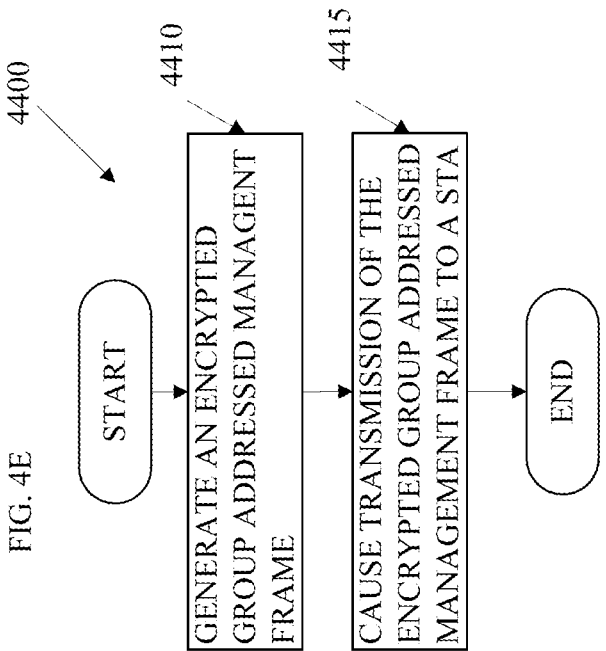
FIG. 4E depicts an embodiment to transmit an encrypted group addressed management frame or an encrypted group addressed management frame.

At FIG. 4E, there is shown a flowchart 4400 to illustrate a communication of an encrypted group addressed management frame from an AP STA (e.g., the mobile AP 1006 of FIG. 1A and the AP STA 1210 of FIG. 1C) to a STA (e.g., user devices 1020 in FIG. 1A and STA 1230 in FIG. 1C). At element 4410, the AP STA may generate a group addressed management frame such as a beacon frame, a probe response frame, a fast initial link setup (FILS) discovery frame, an open programmability system (OPS) frame, a disassociation frame, or a deauthentication frame. Prior to passing the MSDU from the MAC to the PHY, the encryption logic circuitry may encrypt the data field or payload of the MSDU with a MFGTK or MLO-MFGTK together with a cipher suite for encryption of group addressed management frames.

After encryption of the data field or payload portion of the MSDU, the encryption logic circuitry may pass the MSDU as a MPDU to the PHY of the AP STA for transmission to the STA. The PHY may cause transmission of the encrypted group addressed management frame to the STA at element 4415.

At FIG. 4F, there is shown a flowchart 4500 to illustrate a communication of an encrypted group addressed management from an AP STA (e.g., the mobile AP 1006 of FIG. 1A and the AP STA 1210 of FIG. 1C) to a STA (e.g., user devices 1020 in FIG. 1A and STA 1230 in FIG. 1C). At element 4510, the STA may receive an encrypted group addressed management frame within a PPDU. The PHY may decode the PPDU to determine one or more MPDUs in the payload of the PPDU and pass the one or more MPDUs to the MAC as MSDUs at element 4515.

After receipt of the MSDUs, the encryption logic circuitry of the STA may decrypt the data field of the one or more MSDUs to determine the data fields of the one or more MSDUs. The encryption logic circuitry of the STA may decrypt the data fields using the MFGTK, MLO-MFGTK, GTK, or MLO-GTK together with the cipher suite for group addressed management frames.

Figure 5:
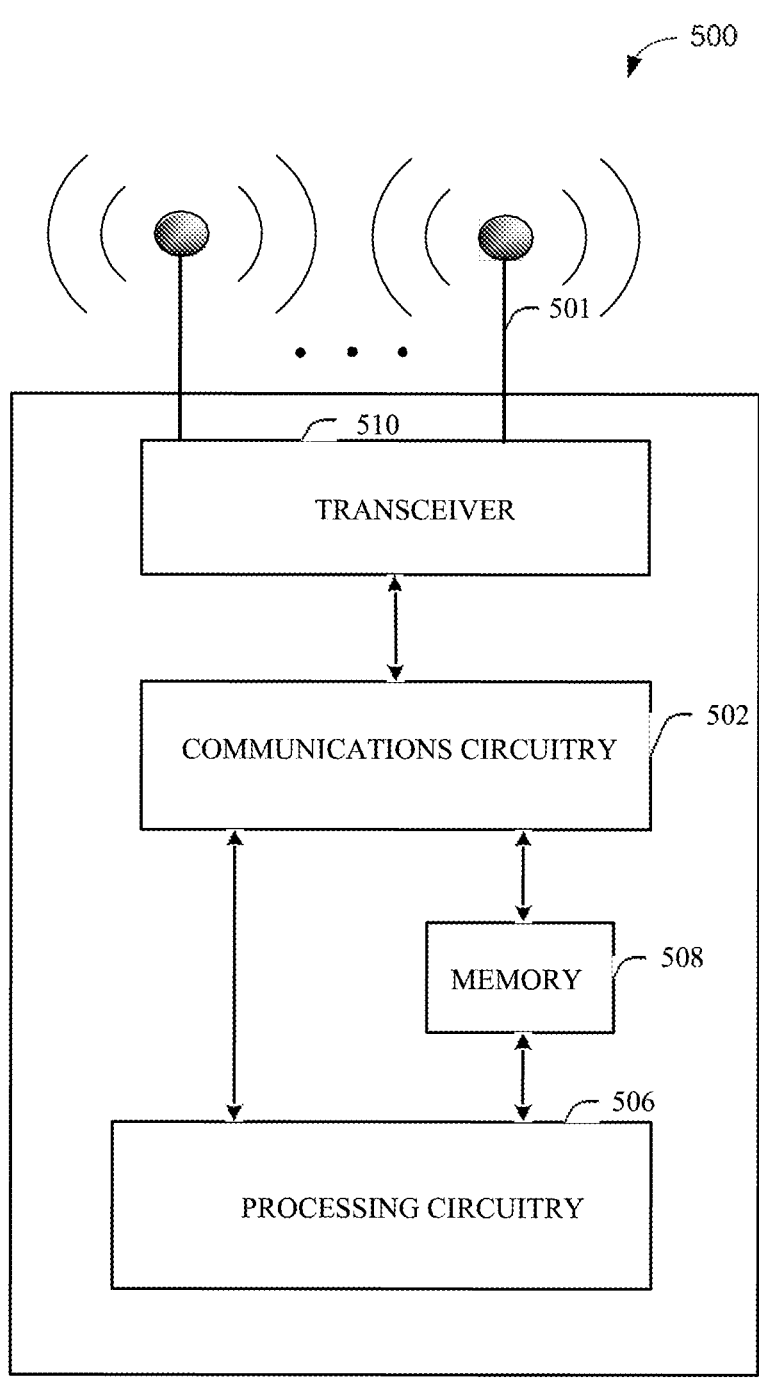
FIG. 5 depicts an embodiment of a functional diagram of a wireless communication device, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of a communication station that may be suitable for use as a mobile AP 1006 (FIG. 1A) or a user device 1028 (FIG. 1A) in accordance with some embodiments. The communication station 500 may also be suitable for use as other user device(s) 1020 such as the user devices 1024 and/or 1026. The user devices 1024 and/or 1026 may include, e.g., a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
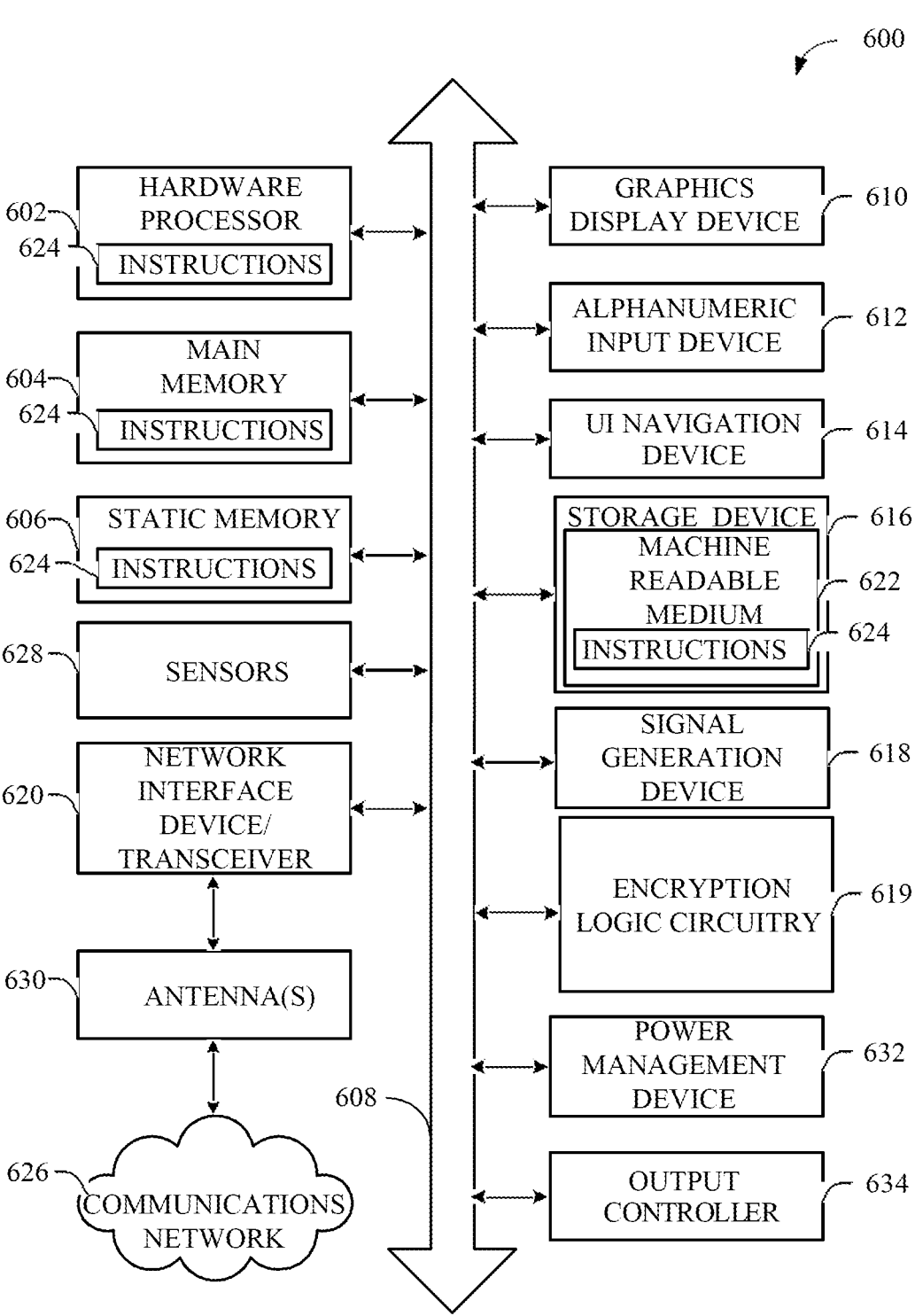
FIG. 6 depicts an embodiment of a block diagram of a machine upon which any of one or more techniques may be performed, in accordance with one or more embodiments.

FIG. 6 illustrates a block diagram of an example of a machine 600 or system upon which any one or more of the techniques (e.g., methodologies) discussed herein may be performed. For instance, the machine may comprise an AP STA such as the mobile AP 1006 and/or one of the user devices 1020 shown in FIG. 1A. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via one or more interlinks (e.g., buses or high speed interconnects) 608. Note that the single set of interlinks 608 may be representative of the physical interlinks in some embodiments but is not representative of the physical interlinks 608 in other embodiments. For example, the main memory 604 may couple directly with the hardware processor 602 via high speed interconnects or a main memory bus. The high speed interconnects typically connect two devices and the bus is generally designed to interconnect two or more devices and include an arbitration scheme to provide fair access to the bus by the two or more devices.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a encryption logic circuitry 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor such as the baseband processing circuitry 1218 and/or 1248 shown in FIG. 1C. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the encryption logic circuitry 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The encryption logic circuitry 619 may carry out or perform any of the operations and processes (e.g., processes 4000, 4100, 4200, 4300, 4400, and 4500 shown in FIGS. 4A-4F) described and shown above.

It is understood that the above are only a subset of what the encryption logic circuitry 619 may be configured to perform and that other functions included throughout this disclosure may also be performed by the encryption logic circuitry 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figures 7, 8:
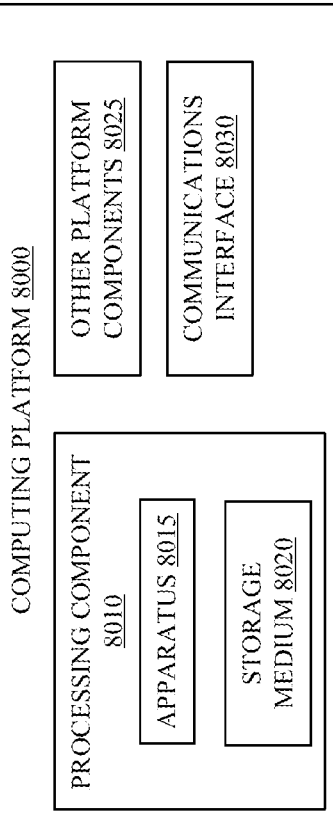
FIGS. 7-8 depict embodiments of a computer-readable storage medium and a computing platform to implement encryption logic circuitry.

FIG. 7 illustrates an example of a storage medium 7000 to store encryption logic such as logic to implement the encryption logic circuitry 619 shown in FIG. 6 and/or the other logic discussed herein for defining one or more procedures, one or more keys, cipher suites, capability bits, replay counters, frames, KDEs, subelements, and fields for encryption and decryption of group addressed management frames. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

FIG. 8 illustrates an example computing platform 8000 such as the mobile AP 1006, user devices 1020, AP STA 1210, and STAs 1210, 1230, 1290, 1292, 1294, 1296, and 1298 in FIGS. 1A and 1C. In some examples, as shown in FIG. 8, computing platform 8000 may include a processing component 8010, other platform components or a communications interface 8030 such as the wireless network interfaces 1222 and 1252 shown in FIG. 1A. According to some examples, computing platform 8000 may be a computing device such as a server in a system such as a data center or server farm that supports a manager or controller for managing configurable computing resources as mentioned above.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Advantages of Some Embodiments

Several embodiments have one or more potentially advantages effects. For instance, use of encryption in all current robust group addressed management frames, advantageously protects PII for mobile APs. Defining one or more keys and cipher suites for encryption of group addressed management frames, advantageously facilitates encryption of group addressed management frames. Defining a capability bit for support or enablement of group addressed management frames, advantageously communicates desirable a capability to STAs. Encrypting disassociation frames advantageously avoids or prevents leakage of vendor specific elements. Encrypting deauthentication frames advantageously avoids or prevents leakage of vendor specific elements.

EXAMPLES OF FURTHER EMBODIMENTS

The following examples pertain to further embodiments. Specifics in the examples may be used anywhere in one or more embodiments.

Example 1 is a device comprising memory; and logic circuitry coupled to the memory, the logic circuitry configured to generate a management frame comprising a robust security network (RSN) element (RSNE), the management frame comprising a cipher suite field with a cipher suite used together with a set of one or more keys to encrypt the group addressed management frames; and cause transmission of the management frame to one or more stations (STAs). In Example 2, the device of Example 1, wherein the logic circuitry comprises baseband processing circuitry and further comprising a radio coupled with the baseband processing circuitry, and one or more antennas coupled with the radio to transmit the management frame. In Example 3, the device of Example 1, wherein the RSNE comprises the cipher suite field, the cipher suite field to indicate the cipher suite for encryption for the group addressed management frames, the cipher suite to indicate a cipher-block chaining message protocol (CCMP) or a Galois/counter mode (GCM) protocol (GCMP) to indicate use of encryption for the group addressed management frames. In Example 4, the device of Example 3, wherein a group management cipher suite field of the RSNE comprises the cipher suite used together with the set of one or more keys for encryption of the group addressed management frames. In Example 5, the device of Example 1, wherein the cipher suite used together with the set of one or more keys for encryption of the group addressed management frames is defined in a RSN extension element (RSNXE) in the management frame. In Example 6, the device of Example 1, the logic circuitry further configured to cause transmission of a management frame group temporal key (MFGTK) in a key field of a MFGTK key descriptor element (KDE) or a MFGTK in a key field of a MFGTK subelement. In Example 7, the device of Example 6, wherein the MFGTK KDE or MFGTK subelement comprises a linkID field for multi-link operation (MLO). In Example 8, the device of Example 6, wherein the MFGTK subelement is defined under a Fast basic service set (BSS) Transition element (FTE) or a wireless network management (WNM) Sleep Mode Response frame. In Example 9, the device of Example 1, wherein the group addressed management frames comprise beacon frames, probe response frames, fast initial link setup (FILS) discovery frames, open programmability system (OPS) frames, disassociation frames, and deauthentication frames. In Example 10, the device of Example 1, wherein the management frame comprises a capability bit to indicate that encryption of the group addressed management frames is supported or is enabled. In Example 11, the device of Example 1, wherein the cipher suite used together with the set of one or more keys indicates CCMP-128, CCMP-256, GCMP-128, or GCMP-256 for encryption of the group addressed management frames. In Example 12, the device of Example 1, wherein a capability bit to indicate group management frame encryption support or enablement is defined in a RSN extension element (RSNXE) or another capabilities element. In Example 13, the device of Example 1, the logic circuitry further configured to encrypt the group addressed management frames for transmission in a first basic service set (BSS) with a management frame group temporal key (MFGTK), and to encrypt the group addressed management frames for transmission in a second BSS with a group temporal key (GTK) of the set of one or more keys.

Example 14 is a non-transitory computer-readable medium storing computer-executable instructions which when executed by one or more processors, result in performing operations to generate a management frame comprising a robust security network (RSN) element (RSNE), the management frame comprising a cipher suite field with a cipher suite used together with a set of one or more keys to encrypt the group addressed management frames; and cause transmission of the management frame to one or more stations (STAs). In Example 15, the non-transitory computer-readable medium of Example 14, wherein the RSNE comprises the cipher suite field, the cipher suite field to indicate the cipher suite for encryption for the group addressed management frames, the cipher suite to indicate a cipher-block chaining message protocol (CCMP) or a Galois/counter mode (GCM) protocol (GCMP) to indicate use of encryption for the group addressed management frames. In Example 16, the non-transitory computer-readable medium of Example 15, wherein a group management cipher suite field of the RSNE comprises the cipher suite used together with the set of one or more keys for encryption of the group addressed management frames. In Example 17, the non-transitory computer-readable medium of Example 14, wherein the cipher suite used together with the set of one or more keys for encryption of the group addressed management frames is defined in a RSN extension element (RSNXE) in the management frame. In Example 18, the non-transitory computer-readable medium of Example 14, the operations further to cause transmission of a management frame group temporal key (MFGTK) in a key field of a MFGTK key descriptor element (KDE) or a MFGTK in a key field of a MFGTK subelement. In Example 19, the non-transitory computer-readable medium of Example 18, wherein the MFGTK KDE or MFGTK subelement comprises a linkID field for multi-link operation (MLO). In Example 20, the non-transitory computer-readable medium of Example 18, wherein the MFGTK subelement is defined under a Fast basic service set (BSS) Transition element (FTE) or a wireless network management (WNM) Sleep Mode Response frame. In Example 21, the non-transitory computer-readable medium of Example 14, wherein the group addressed management frames comprise beacon frames, probe response frames, fast initial link setup (FILS) discovery frames, open programmability system (OPS) frames, disassociation frames, and deauthentication frames. In Example 22, the non-transitory computer-readable medium of Example 14, wherein the management frame comprises a capability bit to indicate that encryption of the group addressed management frames is supported or is enabled. In Example 23, the non-transitory computer-readable medium of Example 14, wherein the cipher suite used together with the set of one or more keys indicates CCMP-128, CCMP-256, GCMP-128, or GCMP-256 for encryption of the group addressed management frames. In Example 24, the non-transitory computer-readable medium of Example 14, wherein a capability bit to indicate group management frame encryption support or enablement is defined in a RSN extension element (RSNXE) or another capabilities element. In Example 25, the non-transitory computer-readable medium of Example 14, the operations further to encrypt the group addressed management frames for transmission in a first basic service set (BSS) with a management frame group temporal key (MFGTK), and to encrypt the group addressed management frames for transmission in a second BSS with a group temporal key (GTK) of the set of one or more keys.

Example 26 is a method comprising generating a management frame comprising a robust security network (RSN) element (RSNE), the management frame comprising a cipher suite field with a cipher suite used together with a set of one or more keys to encrypt the group addressed management frames; and causing transmission of the management frame to one or more stations (STAs). In Example 27, the method of Example 26, wherein the RSNE comprises the cipher suite field, the cipher suite field to indicate the cipher suite for encryption for the group addressed management frames, the cipher suite to indicate a cipher-block chaining message protocol (CCMP) or a Galois/counter mode (GCM) protocol (GCMP) to indicate use of encryption for the group addressed management frames. In Example 28, the method of Example 27, wherein a group management cipher suite field of the RSNE comprises the cipher suite used together with the set of one or more keys for encryption of the group addressed management frames. In Example 29, the method of Example 26, wherein the cipher suite used together with the set of one or more keys for encryption of the group addressed management frames is defined in a RSN extension element (RSNXE) in the management frame. In Example 30, the method of Example 26, further comprising causing transmission of a management frame group temporal key (MFGTK) in a key field of a MFGTK key descriptor element (KDE) or a MFGTK in a key field of a MFGTK subelement. In Example 31, the method of Example 30, wherein the MFGTK KDE or MFGTK subelement comprises a linkID field for multi-link operation (MLO). In Example 32, the method of Example 30, wherein the MFGTK subelement is defined under a Fast basic service set (BSS) Transition element (FTE) or a wireless network management (WNM) Sleep Mode Response frame. In Example 33, the method of Example 26, wherein the group addressed management frames comprise beacon frames, probe response frames, fast initial link setup (FILS) discovery frames, open programmability system (OPS) frames, disassociation frames, and deauthentication frames. In Example 34, the method of Example 26, wherein the management frame comprises a capability bit to indicate that encryption of the group addressed management frames is supported or is enabled. In Example 35, the method of Example 26, wherein the cipher suite used together with the set of one or more keys indicates CCMP-128, CCMP-256, GCMP-128, or GCMP-256 for encryption of the group addressed management frames. In Example 36, the method of Example 26, wherein a capability bit to indicate group management frame encryption support or enablement is defined in a RSN extension element (RSNXE) or another capabilities element. In Example 37, the method of Example 26, further comprising encrypting the group addressed management frames for transmission in a first basic service set (BSS) with a management frame group temporal key (MFGTK), and to encrypt the group addressed management frames for transmission in a second BSS with a group temporal key (GTK) of the set of one or more keys.

Example 38 is an apparatus comprising a means for generating a group addressed management frame comprising one or more fields to carry inform associated with one or more station devices (STAs); a means for encrypting the group addressed management frame using one or more keys; and a means for causing to transmit the group addressed management frame to the one or more STAs. In Example 39, the apparatus of Example 38, wherein the RSNE comprises the cipher suite field, the cipher suite field to indicate the cipher suite for encryption for the group addressed management frames, the cipher suite to indicate a cipher-block chaining message protocol (CCMP) or a Galois/counter mode (GCM) protocol (GCMP) to indicate use of encryption for the group addressed management frames. In Example 40, the apparatus of Example 39, wherein a group management cipher suite field of the RSNE comprises the cipher suite used together with the set of one or more keys for encryption of the group addressed management frames. In Example 41, the apparatus of Example 38, wherein the cipher suite used together with the set of one or more keys for encryption of the group addressed management frames is defined in a RSN extension element (RSNXE) in the management frame. In Example 42, the apparatus of Example 38, further comprising a means for causing transmission of a management frame group temporal key (MFGTK) in a key field of a MFGTK key descriptor element (KDE) or a MFGTK in a key field of a MFGTK subelement. In Example 43, the apparatus of Example 42, wherein the MFGTK KDE or MFGTK subelement comprises a linkID field for multi-link operation (MLO). In Example 44, the apparatus of Example 42, wherein the MFGTK subelement is defined under a Fast basic service set (BSS) Transition element (FTE) or a wireless network management (WNM) Sleep Mode Response frame. In Example 45, the apparatus of Example 38, wherein the group addressed management frames comprise beacon frames, probe response frames, fast initial link setup (FILS) discovery frames, open programmability system (OPS) frames, disassociation frames, and deauthentication frames. In Example 46, the apparatus of Example 38, wherein the management frame comprises a capability bit to indicate that encryption of the group addressed management frames is supported or is enabled. In Example 47, the apparatus of Example 38, wherein the cipher suite used together with the set of one or more keys indicates CCMP-128, CCMP-256, GCMP-128, or GCMP-256 for encryption of the group addressed management frames. In Example 48, the apparatus of Example 38, wherein a capability bit to indicate group management frame encryption support or enablement is defined in a RSN extension element (RSNXE) or another capabilities element. In Example 49, the apparatus of Example 38, further comprising a means for encrypting the group addressed management frames for transmission in a first basic service set (BSS) with a management frame group temporal key (MFGTK), and to encrypt the group addressed management frames for transmission in a second BSS with a group temporal key (GTK) of the set of one or more keys.

Example 50 is an apparatus comprising a memory; and logic circuitry coupled with the memory to receive a management frame comprising a robust security network (RSN) element (RSNE), the management frame comprising a cipher suite field with a cipher suite used together with a set of one or more keys to encrypt the group addressed management frames; and decode the management frame to determine the cipher suite used together with the set of one or more keys for encryption of group addressed management frames. In Example 51, the apparatus of Example 50, wherein the logic circuitry comprises baseband processing circuitry and further comprising a radio coupled with the baseband processing circuitry, and one or more antennas coupled with the radio to receive the management frame. In Example 52, the apparatus of Example 50, the logic circuitry further configured to define a replay counter to check for replay of the encrypted group addressed management frames. In Example 53, the apparatus of Example 50, wherein the RSNE comprises the cipher suite field, the cipher suite field to indicate the cipher suite for encryption for the group addressed management frames, the cipher suite to indicate a cipher-block chaining message protocol (CCMP) or a Galois/counter mode (GCM) protocol (GCMP) to indicate use of encryption for the group addressed management frames. In Example 54, the apparatus of Example 53, wherein a group management cipher suite field of the RSNE comprises the cipher suite used together with the set of one or more keys for encryption of the group addressed management frames. In Example 55, the apparatus of Example 50, wherein the cipher suite used together with the set of one or more keys for encryption of the group addressed management frames is defined in a RSN extension element (RSNXE) in the management frame. In Example 56, the apparatus of Example 50, the logic circuitry further configured to decode a management frame group temporal key (MFGTK) in a key field of a MFGTK key descriptor element (KDE) or a MFGTK in a key field of a MFGTK subelement. In Example 57, the apparatus of Example 56, wherein the MFGTK KDE or the MFGTK subelement comprises a linkID field for multi-link operation (MLO). In Example 58, the apparatus of Example 56, wherein the MFGTK subelement is defined under a Fast basic service set (BSS) Transition element (FTE) or a wireless network management (WNM) Sleep Mode Response frame. In Example 59, the apparatus of Example 50, wherein the group addressed management frames comprise beacon frames, probe response frames, fast initial link setup (FILS) discovery frames, open programmability system (OPS) frames, disassociation frames, and deauthentication frames. In Example 60, the apparatus of Example 50, wherein the management frame comprises a capability bit to indicate that encryption of the group addressed management frames is supported or is enabled. In Example 61, the apparatus of Example 50, wherein the cipher suite for the set of one or more keys indicates CCMP-128, CCMP-256, GCMP-128, or GCMP-256 for encryption of the group addressed management frames. In Example 62, the apparatus of Example 50, wherein a capability bit to indicate group management frame encryption support or enablement is defined in a RSN extension element (RSNXE) or another capabilities element. In Example 63, the apparatus of Example 50, the logic circuitry further configured to decrypt the group addressed management frames with a management frame group temporal key (MFGTK) of the set of one or more keys. In Example 64, the apparatus of Example 50, the logic circuitry further configured to decrypt the group addressed management frames with a group temporal key (GTK) of the set of one or more keys.

Example 65 is a method comprising receiving a management frame comprising a robust security network (RSN) element (RSNE), the management frame comprising a cipher suite field with a cipher suite used together with a set of one or more keys to encrypt the group addressed management frames; and decoding the management frame to determine the cipher suite used together with the set of one or more keys for encryption of group addressed management frames. In Example 66, the method of Example 65, further comprising defining a replay counter to check for replay of the encrypted group addressed management frames. In Example 67, the method of Example 65, wherein the RSNE comprises the cipher suite field, the cipher suite field to indicate the cipher suite for encryption for the group addressed management frames, the cipher suite to indicate a cipher-block chaining message protocol (CCMP) or a Galois/counter mode (GCM) protocol (GCMP) to indicate use of encryption for the group addressed management frames. In Example 68, the method of Example 67, wherein a group management cipher suite field of the RSNE comprises the cipher suite used together with the set of one or more keys for encryption of the group addressed management frames. In Example 69, the method of Example 65, wherein the cipher suite used together with the set of one or more keys for encryption of the group addressed management frames is defined in a RSN extension element (RSNXE) in the management frame. In Example 70, the method of Example 65, further comprising decoding a management frame group temporal key (MFGTK) in a key field of a MFGTK key descriptor element (KDE) or a MFGTK in a key field of a MFGTK subelement. In Example 71, the method of Example 70, wherein the MFGTK KDE or the MFGTK subelement comprises a linkID field for multi-link operation (MLO). In Example 72, the method of Example 70, wherein the MFGTK subelement is defined under a Fast basic service set (BSS) Transition element (FTE) or a wireless network management (WNM) Sleep Mode Response frame. In Example 73, the method of Example 65, wherein the group addressed management frames comprise beacon frames, probe response frames, fast initial link setup (FILS) discovery frames, open programmability system (OPS) frames, disassociation frames, and deauthentication frames. In Example 74, the method of Example 65, wherein the management frame comprises a capability bit to indicate that encryption of the group addressed management frames is supported or is enabled. In Example 75, the method of Example 65, wherein the cipher suite for the set of one or more keys indicates CCMP-128, CCMP-256, GCMP-128, or GCMP-256 for encryption of the group addressed management frames. In Example 76, the method of Example 65, wherein a capability bit to indicate group management frame encryption support or enablement is defined in a RSN extension element (RSNXE) or another capabilities element. In Example 77, the method of Example 65, further comprising decrypting the group addressed management frames with a management frame group temporal key (MFGTK) of the set of one or more keys. In Example 78, the method of Example 65, further comprising decrypting the group addressed management frames with a group temporal key (GTK) of the set of one or more keys.

Example 79 is an apparatus comprising a means for receive a management frame comprising a robust security network (RSN) element (RSNE), the management frame comprising a cipher suite field with a cipher suite used together with a set of one or more keys to encrypt the group addressed management frames; and a means for decoding the management frame to determine the cipher suite used together with the set of one or more keys for encryption of group addressed management frames. In Example 80, the apparatus of Example 79, wherein the logic circuitry comprises baseband processing circuitry and further comprising a radio coupled with the baseband processing circuitry, and one or more antennas coupled with the radio to transmit the second PPDU. In Example 81, the apparatus of Example 79, further comprising a means for defining a replay counter to check for replay of the encrypted group addressed management frames. In Example 82, the apparatus of Example 79, wherein the RSNE comprises the cipher suite field, the cipher suite field to indicate the cipher suite for encryption for the group addressed management frames, the cipher suite to indicate a cipher-block chaining message protocol (CCMP) or a Galois/counter mode (GCM) protocol (GCMP) to indicate use of encryption for the group addressed management frames. In Example 83, the apparatus of Example 82, wherein a group management cipher suite field of the RSNE comprises the cipher suite used together with the set of one or more keys for encryption of the group addressed management frames. In Example 84, the apparatus of Example 79, wherein the cipher suite used together with the set of one or more keys for encryption of the group addressed management frames is defined in a RSN extension element (RSNXE) in the management frame. In Example 85, the apparatus of Example 79, further comprising a means for decoding a management frame group temporal key (MFGTK) in a key field of a MFGTK key descriptor element

50

(KDE) or a MFGTK in a key field of a MFGTK subelement. In Example 86, the apparatus of Example 85, wherein the MFGTK KDE or the MFGTK subelement comprises a linkID field for multi-link operation (MLO). In Example 87, the apparatus of Example 85, wherein the MFGTK subelement is defined under a Fast basic service set (BSS) Transition element (FTE) or a wireless network management (WNM) Sleep Mode Response frame. In Example 88, the apparatus of Example 79, wherein the group addressed management frames comprise beacon frames, probe response frames, fast initial link setup (FILS) discovery frames, open programmability system (OPS) frames, disassociation frames, and deauthentication frames. In Example 89, the apparatus of Example 79, wherein the management frame comprises a capability bit to indicate that encryption of the group addressed management frames is supported or is enabled. In Example 90, the apparatus of Example 79, wherein the cipher suite for the set of one or more keys indicates CCMP-128, CCMP-256, GCMP-128, or GCMP-256 for encryption of the group addressed management frames. In Example 91, the apparatus of Example 79, wherein a capability bit to indicate group management frame encryption support or enablement is defined in a RSN extension element (RSNXE) or another capabilities element. In Example 92, the apparatus of Example 79, further comprising a means for decrypting the group addressed management frames with a management frame group temporal key (MFGTK) of the set of one or more keys. In Example 93, the apparatus of Example 79, further comprising a means for decrypting the group addressed management frames with a group temporal key (GTK) of the set of one or more keys.

What is claimed is:

1. A device comprising:

memory; and processing circuitry, of an access point multi-link device (AP MLD), coupled to the memory, the processing circuitry configured to:

generate a robust security network (RSN) element (RSNE) or an RSN extension element (RSNXE) comprising a capabilities element, the capabilities element to indicate a cipher suite for use with a group temporal key (GTK) for encryption of group addressed management frames;

generate a first frame comprising the RSNE or RSNXE;

send the first frame to one or more stations (STAs);

encrypt, with the GTK in accordance with the cipher suite, a first group addressed management frame; and send the first group addressed management frame to the one or more STAs.

2. The device of claim 1, wherein the processing circuitry comprises baseband processing circuitry and further comprising a radio coupled with the baseband processing circuitry, and one or more antennas coupled with the radio to transmit the first frame.

3. The device of claim 1, the processing circuitry further configured to encrypt the first group addressed management frame with the GTK.

4. The device of claim 3, the cipher suite to indicate a cipher-block chaining message protocol (CCMP) or a Galois/counter mode (GCM) protocol (GCMP) for encryption of the group addressed management frames.

5. The device of claim 4, the cipher suite to indicate CCMP-128, CCMP-256, GCMP-128, or GCMP-256 for encryption of the group addressed management frames.

6. The device of claim 1, the processing circuitry further configured to send the GTK in a key field of a GTK key descriptor element (KDE).

7. The device of claim 1, the processing circuitry further configured to send the GTK in a key field of a GTK subelement.

8. The device of claim 7, wherein the GTK subelement comprises a Link ID field for multi-link operation (MLO).

9. The device of claim 7, wherein the GTK subelement is defined under a Fast basic service set (BSS) Transition element (FTE).

10. The device of claim 1, wherein the group addressed management frames comprise beacon frames, probe response frames, disassociation frames, and deauthentication frames, wherein the capabilities element further indicates the cipher suite for use with the GTK for encryption of group addressed fast initial link setup (FILS) discovery frames and open programmability system (OPS) frames.

11. The device of claim 1, wherein the first frame comprises an association response frame, a reassociation response frame, a beacon frame, or an authentication frame.

12. The device of claim 1, wherein the first frame comprises a capability bit to indicate that encryption of the group addressed management frames is supported or is enabled.

13. The device of claim 1, the processing circuitry further configured to define a replay counter to check for replay of the group addressed management frames and other frames, wherein the group addressed management frames comprise beacon frames, probe response frames, disassociation frames, deauthentication frames, or a combination thereof, wherein the other frames include fast initial link setup (FILS) discovery frames, open programmability system (OPS) frames, or a combination thereof.

14. An apparatus comprising:
a memory; and
processing circuitry coupled with the memory to:
receive, from an access point multi-link device (AP MLD), a first frame comprising a robust security network (RSN) element (RSNE) or an RSN extension element (RSNXE);
decode the RSNE or the RSNXE to determine a cipher suite from a cipher suite field of the RSNE or the RSNXE for use with a GTK to decrypt group addressed management frames;
receive a first group addressed management frame; and
decrypt the first group addressed management frame with the GTK in accordance with the cipher suite.

15. The apparatus of claim 14, wherein the processing circuitry comprises baseband processing circuitry and further comprising a radio coupled with the baseband processing circuitry, and one or more antennas coupled with the radio to receive the first frame.

16. The apparatus of claim 14, the circuitry further configured to define a replay counter to check for replay of the group addressed management frames and other frames, wherein the group addressed management frames comprise beacon frames, probe response frames, disassociation frames, and deauthentication frames, wherein the other frames comprise fast initial link setup (FILS) discovery frames and open programmability system (OPS) frames.

17. The apparatus of claim 14, wherein the RSNE or RSNXE indicates a cipher-block chaining message protocol (CCMP) or a Galois/counter mode (GCM) protocol (GCMP) encryption and decryption for the group addressed management frames, fast initial link setup (FILS) discovery frames, and open programmability system (OPS) frames.

18. The apparatus of claim 17, the cipher suite to indicate CCMP-128, CCMP-256, GCMP-128, or GCMP-256 for encryption of the group addressed management frames, fast initial link setup (FILS) discovery frames, and open programmability system (OPS) frames.

19. The apparatus of claim 14, wherein the first frame comprises an association response frame, a reassociation response frame, a beacon frame, or an authentication frame.

20. The apparatus of claim 14, wherein the first frame comprises a capability bit to indicate that encryption of the group addressed management frames is supported or is enabled.

21. A machine-readable medium containing instructions, which when executed by a processor of a base station, cause the processor to perform operations, the operations to:
generate a robust security network (RSN) element (RSNE) or an RSN extension element (RSNXE) comprising a capabilities element, the capabilities element to indicate a cipher suite for use with a group temporal key (GTK) for encryption of group addressed management frames;
generate a first frame comprising the RSNE or RSNXE;
send the first frame to one or more stations (STAs);
encrypt, with the GTK in accordance with the cipher suite, a first group addressed management frame;
send the first group addressed management frame to the one or more STAs.

22. The machine-readable medium of claim 21, the operations to further define a replay counter to check for replay of the group addressed management frames and other frames, wherein the group addressed management frames comprise beacon frames, probe response frames, disassociation frames, and deauthentication frames, wherein the other frames comprise fast initial link setup (FILS) discovery frames and open programmability system (OPS) frames.

23. The machine-readable medium of claim 21, wherein the RSNE or RSNXE indicates a cipher-block chaining message protocol (CCMP) or a Galois/counter mode (GCM) protocol (GCMP) encryption and decryption for the group addressed management frames, fast initial link setup (FILS) discovery frames, and open programmability system (OPS) frames.

24. The machine-readable medium of claim 21, the cipher suite to indicate CCMP-128, CCMP-256, GCMP-128, or GCMP-256 for encryption of the group addressed management frames, fast initial link setup (FILS) discovery frames, and open programmability system (OPS) frames.

25. The machine-readable medium of claim 21, wherein the first frame comprises an association response frame, a reassociation response frame, a beacon frame, or an authentication frame.

* * * * *